(12) United States Patent
Li et al.

(10) Patent No.: US 12,210,213 B2
(45) Date of Patent: Jan. 28, 2025

(54) CAMERA LENS GROUP

(71) Applicant: ZHEJIANG SUNNY OPTICS CO., LTD., Zhejiang (CN)

(72) Inventors: Long Li, Zhejiang (CN); Fujian Dai, Zhejiang (CN); Liefeng Zhao, Zhejiang (CN)

(73) Assignee: ZHEJIANG SUNNY OPTICS CO., LTD., Zhejiang (CN)

( * ) Notice: Subject to any disclaimer, the term of this patent is extended or adjusted under 35 U.S.C. 154(b) by 462 days.

(21) Appl. No.: 17/628,233

(22) PCT Filed: Aug. 12, 2020

(86) PCT No.: PCT/CN2020/108612
§ 371 (c)(1),
(2) Date: Jan. 19, 2022

(87) PCT Pub. No.: WO2021/042954
PCT Pub. Date: Mar. 11, 2021

(65) Prior Publication Data
US 2022/0269044 A1    Aug. 25, 2022

(30) Foreign Application Priority Data
Sep. 4, 2019  (CN) .......................... 201910832999.9

(51) Int. Cl.
*G02B 3/00* (2006.01)
*G02B 9/62* (2006.01)

(52) U.S. Cl.
CPC ............. *G02B 9/62* (2013.01); *G02B 3/0043* (2013.01)

(58) Field of Classification Search
CPC ........ G02B 9/62; G02B 3/0043; G02B 13/06; G02B 13/18; G02B 13/0045
(Continued)

(56) References Cited

U.S. PATENT DOCUMENTS 9,354,431 B2    5/2016  Lee
10,203,478 B1 *  2/2019  Oinuma ............. G02B 13/0045
(Continued)

FOREIGN PATENT DOCUMENTS

CN    105093498 A    11/2015
CN    105425363 A    3/2016
(Continued)

*Primary Examiner* — Wyatt A Stoffa
*Assistant Examiner* — John Curtis Sipes
(74) *Attorney, Agent, or Firm* — Grogan, Tuccillo & Vanderleeden, LLP

(57) ABSTRACT

A camera lens group sequentially includes, from an object side to an image side along an optical axis: a first lens (E1) with a refractive power, wherein an object-side surface (S1) thereof is a concave surface, while an image-side surface (S2) is a convex surface; a second lens (E2) with a refractive power, wherein an object-side surface (S3) is a convex surface, while an image-side surface (S4) is a concave surface; a third lens (E3) with a positive refractive power; a fourth lens (E4) with a refractive power; a fifth lens (E5) with a positive refractive power, wherein an object-side surface (S9) thereof is a concave surface, while an image-side surface (S10) is a convex surface; and a sixth lens (E6) with a negative refractive power, wherein an object-side surface (S11) thereof is a convex surface, while an image-side surface (S12) is a concave surface. A half ImgH of a diagonal length of an effective pixel region on an imaging surface (S15) of the camera lens group meets ImgH>4.60 mm.

20 Claims, 12 Drawing Sheets

(58) Field of Classification Search
USPC .................................. 359/658, 713, 752, 756
See application file for complete search history.

(56) References Cited

U.S. PATENT DOCUMENTS

| | | | |
|---|---|---|---|
| 10,241,298 B1* | 3/2019 | Oinuma | G02B 13/0045 |
| 10,254,514 B1* | 4/2019 | Sato | G02B 13/0045 |
| 11,209,620 B2* | 12/2021 | Kenji | G02B 13/0045 |
| 2012/0229917 A1* | 9/2012 | Huang | G02B 13/0045 |
| | | | 359/713 |
| 2018/0017764 A1* | 1/2018 | Kang | G02B 9/60 |
| 2018/0246298 A1* | 8/2018 | Huang | G02B 13/0045 |
| 2019/0324236 A1* | 10/2019 | Kim | G02B 15/177 |
| 2020/0249434 A1* | 8/2020 | Lin | G02B 13/18 |
| 2021/0018727 A1* | 1/2021 | Hagiwara | G02B 9/60 |

FOREIGN PATENT DOCUMENTS

| | | |
|---|---|---|
| CN | 107402430 A | 11/2017 |
| CN | 109828345 A | 5/2019 |
| CN | 110456485 A | 11/2019 |

* cited by examiner longitudinal aberration curve

CAMERA LENS GROUP

CROSS-REFERENCE TO RELATED APPLICATION(S)

The disclosure claims priority to and the benefit of Chinese Patent Application No. 201910832999.9, filed in the China National Intellectual Property Administration (CNIPA) on 4 Sep. 2019, which is incorporated herein by reference in its entirety.

TECHNICAL FIELD

The disclosure relates to the field of optical elements, and particularly to a camera lens group.

BACKGROUND

At present, with the rapid development of portable electronic products such as smart phones and tablet computers, users have made increasing requirements to camera functions of the portable electronic products. It is expected by a user that a camera function of a mobile phone may achieve a shooting effect similar to that a professional camera device may achieve.

In order to improve the shooting effect of a mobile phone as much as possible, multi-lens cameras such as dual-lens and three-lens cameras emerge. At present, a common multi-lens camera usually adopts a combination of wide-angle and telephoto lenses. The wide-angle lens and the telephoto lens may be matched to improve the shooting effect of a camera module of the mobile phone greatly. Particularly when the wide-angle lens may have the features of wide angle and large image surface, not only may a large field of view FOV be achieved, but also a great depth of field may be provided.

However, a conventional wide-angle lens usually does not have the feature of large image surface. With the development of the portable electronic product to a light and thin design, the miniaturization of the lens is also confronted with a great challenge.

SUMMARY

Some embodiments of the disclosure provide a camera lens group applied to a portable electronic product and capable of at least overcoming or partially overcoming at least one shortcoming in a related art.

An aspect of the disclosure provides a camera lens group, which sequentially includes, from an object side to an image side along an optical axis: a first lens with a refractive power, wherein an object-side surface thereof is a concave surface, while an image-side surface is a convex surface; a second lens with a refractive power, wherein an object-side surface is a convex surface, while an image-side surface is a concave surface; a third lens with a positive refractive power; a fourth lens with a refractive power; a fifth lens with a positive refractive power, wherein an object-side surface thereof is a concave surface, while an image-side surface is a convex surface; and a sixth lens with a negative refractive power, wherein an object-side surface thereof is a convex surface, while an image-side surface is a concave surface.

In an implementation mode, the camera lens group may further include a diaphragm arranged between the second lens and the third lens.

In an implementation mode, ImgH is a half of a diagonal length of an effective pixel region on an imaging surface of the camera lens group, and ImgH may satisfies: $ImgH > 4.60$ mm.

In an implementation mode, TTL is a distance from the object-side surface of the first lens to the imaging surface of the camera lens group on the optical axis, a total effective focal length f of the camera lens group and TTL and ImgH may satisfy: $4.00 \text{ mm} < TTL/ImgH \times f < 5.50 \text{ mm}$.

In an implementation mode, TTL is a distance from the object-side surface of the first lens to the imaging surface on the optical axis, and TTL and ImgH may satisfy: $TTL/ImgH \leq 1.37$.

In an implementation mode, an effective focal length f3 of the third lens and the total effective focal length f of the camera lens group may satisfy: $1.00 < f3/f < 4.00$.

In an implementation mode, DT61 is a maximum effective radius of the object-side surface of the sixth lens, ImgH and DT61 may satisfy: $1.00 < ImgH/DT61 < 1.50$.

In an implementation mode, a curvature radius R11 of the object-side surface of the sixth lens and a curvature radius R12 of the image-side surface of the sixth lens may satisfy: $1.00 < (R11+R12)/(R11-R12) < 3.00$.

In an implementation mode, a curvature radius R3 of the object-side surface of the second lens and a curvature radius R4 of the image-side surface of the second lens may satisfy: $0.50 < R4/R3 < 2.00$.

In an implementation mode, the curvature radius R3 of the object-side surface of the second lens and the total effective focal length f of the camera lens group may satisfy: $0.50 < f/R3 < 2.50$.

In an implementation mode, SAG41 is a distance from an intersection point of an object-side surface of the fourth lens and the optical axis to an effective radius vertex of the object-side surface of the fourth lens on the optical axis, and SAG42 is a distance from an intersection point of an image-side surface of the fourth lens and the optical axis to an effective radius vertex of the image-side surface of the fourth lens on the optical axis, SAG41 and SAG42 may satisfy: $3.00 < (SAG41+SAG42)/(SAG41-SAG42) < 5.00$.

In an implementation mode, a maximum effective radius DT62 of the image-side surface of the sixth lens and a maximum effective radius DT22 of the image-side surface of the second lens may satisfy: $3.00 < DT62/DT22 < 4.50$.

In an implementation mode, TD is a distance from the object-side surface of the first lens to the image-side surface of the sixth lens on the optical axis and $\Sigma AT$ is a sum of spacing distances of any two adjacent lenses in the first lens to the sixth lens on the optical axis may satisfy: $\Sigma AT/TD < 0.35$.

In an implementation mode, a center thickness CT3 of the third lens on the optical axis and a center thickness CT4 of the fourth lens on the optical axis may satisfy: $2.00 < (CT3+CT4)/(CT3-CT4) < 6.00$.

In an implementation mode, a maximum field of view FOV of the camera lens group may satisfy: $FOV \geq 94.0°$.

According to the disclosure, the six lenses are adopted, and the refractive power and surface types of each lens, the center thickness of each lens, on-axis distances between the lenses, and the like are reasonably configured to achieve at least one beneficial effect of miniaturization, large image surface, wide angle, high image quality, and the like of the optical lens group

BRIEF DESCRIPTION OF THE DRAWINGS

Detailed descriptions made to unrestrictive implementation modes with reference to the following drawings are read to make the other characteristics, purposes and advantages of the disclosure more apparent.

DETAILED DESCRIPTION OF THE EMBODIMENTS

Figure 1:
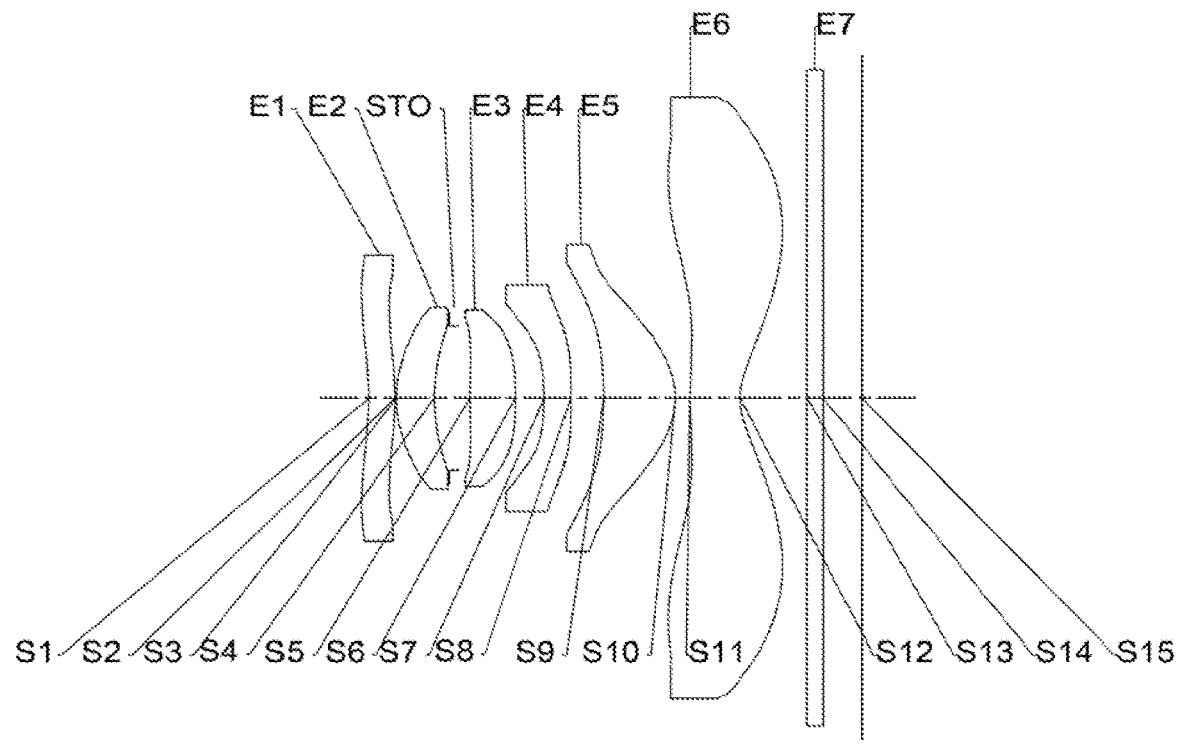
FIG. 1 shows a structure diagram of a camera lens group according to Embodiment 1 of the disclosure.

For understanding the disclosure better, more detailed descriptions will be made to each aspect of the disclosure with reference to the drawings. It is to be understood that these detailed descriptions are only descriptions about the exemplary implementation modes of the disclosure and not intended to limit the scope of the disclosure in any manner. In the whole specification, the same reference sign numbers represent the same components. Expression "and/or" includes any or all combinations of one or more in associated items that are listed.

It should be noted that, in this description, the expressions of first, second, third, etc., are only used to distinguish one feature from another feature, and do not represent any limitation to the feature. Thus, a first lens discussed below could also be referred to as a second lens or a third lens without departing from the teachings of the disclosure.

In the drawings, the thickness, size and shape of the lens have been slightly exaggerated for ease illustration. In particular, a spherical shape or aspheric shape shown in the drawings is shown by some embodiments. That is, the spherical shape or the aspheric shape is not limited to the spherical shape or aspheric shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if a lens surface is a concave surface and a position of the concave surface is not defined, it indicates that the lens surface is a concave surface at least in the paraxial region. A surface, closest to a shot object, of each lens is called an object-side surface of the lens, and a surface, closest to an imaging surface, of each lens is called an image-side surface of the lens.

It should also be understood that terms "include", "including", "have", "contain", and/or "containing", used in the specification, represent existence of a stated characteristic, component and/or part but do not exclude existence or addition of one or more other characteristics, components and parts and/or combinations thereof. In addition, expressions like "at least one in . . . " may appear after a list of listed characteristics not to modify an individual component in the list but to modify the listed characteristics. Moreover, when the implementation modes of the disclosure are described, "may" is used to represent "one or more implementation modes of the disclosure". Furthermore, term "exemplary" refers to an example or exemplary description.

Unless otherwise defined, all terms (including technical terms and scientific terms) used in the disclosure have the same meanings usually understood by those of ordinary skill in the art of the disclosure. It should also be understood that the terms (for example, terms defined in a common dictionary) should be explained to have meanings consistent with the meanings in the context of a related art and may not be explained with ideal or excessively formal meanings, unless clearly defined like this in the disclosure.

It is to be noted that the embodiments in the disclosure and characteristics in the embodiments may be combined without conflicts. The disclosure will be described below with reference to the drawings and in combination with the embodiments in detail.

The features, principles, and other aspects of the disclosure will be described below in detail.

A camera lens group according to an exemplary implementation mode of the disclosure may include six lenses with a refractive power, i.e., a first lens, a second lens, a third lens, a fourth lens, a fifth lens and a sixth lens respectively. The six lenses are sequentially arranged from an object side to an image side along an optical axis. In the first lens to the sixth lens, there may be a spacing distance between any two adjacent lenses.

In an exemplary embodiment, the first lens may have a refractive power, an object-side surface thereof may be a concave surface, while an image-side surface may be a convex surface. The second lens may have a refractive power, an object-side surface thereof may be a convex surface, while an image-side surface may be a concave surface. The third lens may have a positive refractive power. The fourth lens may have a refractive power. The fifth lens may have a positive refractive power, an object-side surface thereof may be a concave surface, while an image-side surface may be a convex surface. The sixth lens may have a negative refractive power, an object-side surface thereof may be a convex surface, while an image-side surface may be a concave surface.

The object-side surface of the first lens is a concave surface, the image-side surface of the first lens is a convex surface, the object-side surface of the second lens is a convex surface, and the image-side surface of the second lens is a concave surface, so that the improvement of the field of view FOV of the camera lens group is facilitated, and a larger field of view FOV is supported. The third lens with a positive refractive power and the fifth lens with a positive refractive power may help to converge rays to ensure the effective convergence of the rays at the same time of improving the field of view FOV of the camera lens group and avoid the excessive concentration of the refractive power of the camera lens group. The setting of the concave-convex surface type of the fifth lens, the setting of the convex-concave surface type of the sixth lens, and the negative refractive power of the sixth lens are favorable for improving the coma of the marginal ray and the spherical aberration of the central light, and may also effectively reduce the risk in the generation of a ghost image between the fifth lens and the sixth lens.

In an exemplary embodiment, the camera lens group according to the disclosure may further include a diaphragm adjusting the amount of incident light. The diaphragm may be arranged between the second lens and the third lens.

In an exemplary embodiment, the camera lens group according to the disclosure may satisfy ImgH>4.60 mm, wherein ImgH is a half of a diagonal length of an effective pixel region on an imaging surface of the camera lens group. Satisfying ImgH>4.60 mm may enlarge the imaging area of the camera lens group, improve the imaging resolution of the camera lens group and make the feature of large image surface more distinctive.

In an exemplary embodiment, the camera lens group according to the disclosure may satisfy 4.00 mm<TTL/ImgH×f<5.50 mm, wherein TTL is a distance from the object-side surface of the first lens to the imaging surface of the camera lens group on the optical axis, and ImgH is a half of the diagonal length of the effective pixel region on the imaging surface, and f is a total effective focal length of the camera lens group. More specifically, TTL, ImgH, and f may further satisfy 4.40 mm<TTL/ImgH×f<5.40 mm. Satisfying 4.00 mm<TTL/ImgH×f<5.50 mm is favorable for maintaining the small size of the camera lens group and avoiding an excessive Total Track Length (TTL) at the same time of improving the field of view (FOV).

In an exemplary embodiment, the camera lens group according to the disclosure may satisfy TTL/ImgH≤1.37, wherein TTL is the distance from the object-side surface of the first lens to the imaging surface of the camera lens group on the optical axis, and ImgH is a half of the diagonal length of the effective pixel region on the imaging surface. Satisfying TTL/ImgH≤1.37 may effectively reduce the overall size of the camera lens group to achieve the ultra-thin feature and small size of the camera lens group, thereby making the camera lens group more applicable to an ultra-thin electronic product.

In an exemplary embodiment, the camera lens group according to the disclosure may satisfy 1.00<f3/f<4.00, wherein f3 is an effective focal length of the third lens, and f is the total effective focal length of the camera lens group. More specifically, f3 and f may further satisfy 1.50<f3/f<3.70. Satisfying 1.00<f3/f<4.00 may not only help to configure the refractive power of the camera lens group to avoid the excessive concentration of the refractive power of the camera lens group on the third lens, but also improve the manufacturability of the third lens.

In an exemplary embodiment, the camera lens group according to the disclosure may satisfy 1.00<ImgH/DT61<1.50, wherein ImgH is a half of the diagonal length of the effective pixel region on the imaging surface of the camera lens group, and DT61 is a maximum effective radius of the object-side surface of the sixth lens. Satisfying 1.00<ImgH/DT61<1.50 may enlarge the imaging area of the camera lens group to achieve a higher resolution of the camera lens group, and meanwhile, may solve the problem that an excessive aperture of the sixth lens finally makes the diameter of the camera lens group excessive to help to maintain the small size of the camera lens group.

In an exemplary embodiment, the camera lens group according to the disclosure may satisfy 1.00<(R11+R12)/(R11−R12)<3.00, wherein R11 is a curvature radius of the object-side surface of the sixth lens, and R12 is a curvature radius of the image-side surface of the sixth lens. More specifically, R11 and R12 may further satisfy 1.50<(R11+R12)/(R11−R12)<2.50. Satisfying 1.00<(R11+R12)/(R11−R12)<3.00 may solve the problems of machining difficulties, etc., caused by the excessive curvature of the surface type at the same time of improving the spherical aberration of the camera lens group by adjusting R11 and R12, and may also help to reduce the risk in the generation of a ghost image in the sixth lens.

In an exemplary embodiment, the camera lens group according to the disclosure may satisfy 0.50<R4/R3<2.00, wherein R3 is a curvature radius of the object-side surface of the second lens, and R4 is a curvature radius of the image-side surface of the second lens. Satisfying 0.50<R4/R3<2.00 is favorable for improving the manufacturability of the second lens to make the second lens easier to machine and form at the same time of improving the field of view (FOV) of the camera lens group.

In an exemplary embodiment, the camera lens group according to the disclosure may satisfy 0.50<f/R3<2.50, wherein R3 is the curvature radius of the object-side surface of the second lens, and f is the total effective focal length of the camera lens group. More specifically, f and R3 may further satisfy 0.80<f/R3<2.10. Satisfying 0.50<f/R3<2.50 is favorable for improving the manufacturability of the second lens. Conditional expression 0.50<R4/R3<2.00 may be matched to further improve the manufacturability of the second lens.

In an exemplary embodiment, the camera lens group according to the disclosure may satisfy 3.00<(SAG41+SAG42)/(SAG41−SAG42)<5.00, wherein SAG41 is a distance from an intersection point of an object-side surface of the fourth lens and the optical axis to an effective radius vertex of the object-side surface of the fourth lens on the optical axis, and SAG42 is a distance from an intersection point of an image-side surface of the fourth lens and the optical axis to an effective radius vertex of the image-side surface of the fourth lens on the optical axis. Satisfying 3.00<(SAG41+SAG42)/(SAG41−SAG42)<5.00 may avoid the fourth lens being curved excessively, reduce difficulties in machining and reduce the spherical aberration of the camera lens group.

In an exemplary embodiment, the camera lens group according to the disclosure may satisfy 3.00<DT62/DT22<4.50, wherein DT62 is a maximum effective radius of the image-side surface of the sixth lens, and DT22 is a maximum effective radius of the image-side surface of the second lens. Satisfying 3.00<DT62/DT22<4.50 is favorable for avoiding an excessive diagram of the camera lens group caused by an excessive aperture of the sixth lens to further help to maintain the small size of the camera lens group at the same time of adjusting an aperture of the diagram of the camera lens group.

In an exemplary embodiment, the camera lens group according to the disclosure may satisfy ΣAT/TD<0.35, wherein TD is a distance from the object-side surface of the first lens to the image-side surface of the sixth lens on the optical axis, and ΣAT is a sum of spacing distances of any two adjacent lenses in the first lens to the sixth lens on the optical axis. More specifically, ΣAT and TD may further satisfy 0.20<ΣAT/TD<0.35. Satisfying ΣAT/TD<0.35 may not only reasonably control the spacing distance between each lens surface to avoid the excessive deflection of the light but also reduce difficulties in machining of the camera lens group.

In an exemplary embodiment, the camera lens group according to the disclosure may satisfy 2.00<(CT3+CT4)/(CT3−CT4)<6.00, wherein CT3 is a center thickness of the third lens on the optical axis, and CT4 is a center thickness of the fourth lens on the optical axis. Satisfying 2.00<(CT3+CT4)/(CT3−CT4)<6.00 is favorable for maintaining the feature of small size of the camera lens group at the same time of improving the distortion of the camera lens group.

In an exemplary embodiment, the camera lens group according to the disclosure may satisfy FOV≥94.0°, wherein FOV is a maximum field of view FOV of the camera lens group. Satisfying FOV≥94.0° may additionally endow the camera lens group with the advantage of wide angle to make the imaging range of the camera lens group wider.

Optionally, the camera lens group may further include an optical filter configured to correct a chromatic aberration and/or protective glass configured to protect a photosensitive element on an imaging surface.

The camera lens group according to the implementation mode of the disclosure may adopt multiple lenses, for example, the abovementioned six lenses. The refractive power and surface types of each lens, the center thickness of each lens, on-axis distances between the lenses and the like are reasonably configured to effectively reduce the size of the camera lens group, improve the manufacturability of the camera lens group and ensure that the camera lens group is more favorable for production and machining and applicable to a portable electronic product. The camera lens group as configured above may have a large image surface, a large field of view FOV and a high imaging resolution and achieve a shooting effect of a great depth of field. The camera lens group according to the disclosure may be combined and matched with a telephoto lens to achieve high imaging quality.

In the implementation mode of the disclosure, at least one of mirror surfaces of each lens is an aspheric mirror surface, namely at least one mirror surface in the object-side surface of the first lens to the image-side surface of the sixth lens is an aspheric mirror surface. An aspheric lens has a characteristic that a curvature keeps changing from a center of the lens to a periphery of the lens. Unlike a spherical lens with a constant curvature from a center of the lens to a periphery of the lens, the aspheric lens has a better curvature radius characteristic and the advantages of improving distortions and improving astigmatic aberrations. With adoption of the aspheric lens, astigmatic aberrations during imaging may be eliminated as much as possible to further improve the imaging quality. Optionally, at least one of the object-side surface and image-side surface of each lens in the first lens, the second lens, the third lens, the fourth lens, the fifth lens and the sixth lens is an aspheric mirror surface. Optionally, both the object-side surface and image-side surface of each lens in the first lens, the second lens, the third lens, the fourth lens, the fifth lens and the sixth lens are aspheric mirror surfaces.

However, those skilled in the art should know that the number of the lenses forming the camera lens group may be changed without departing from the technical solutions claimed in the disclosure to achieve each result and advantage described in the specification. For example, although descriptions are made in the implementation with six lenses as an example, the camera lens group is not limited to six lenses. If necessary, the camera lens group may further include another number of lenses.

Specific embodiments applied to the camera lens group of the abovementioned implementation mode will further be described below with reference to the drawings.

Embodiment 1

A camera lens group according to Embodiment 1 of the disclosure will be described below with reference to FIGS. 1-2C. FIG. 1 is a structure diagram of a camera lens group according to Embodiment 1 of the disclosure.

As shown in FIG. 1, the camera lens group sequentially includes, from an object side to an image side, a first lens E1, a second lens E2, a diaphragm STO, a third lens E3, a fourth lens E4, a fifth lens E5, a sixth lens E6, an optical filter E7, and an imaging surface S15.

The first lens E1 has a positive refractive power, an object-side surface S1 thereof is a concave surface, while an image-side surface S2 is a convex surface. The second lens E2 has a positive refractive power, an object-side surface S3 thereof is a convex surface, while an image-side surface S4 is a concave surface. The third lens E3 has a positive refractive power, an object-side surface S5 thereof is a convex surface, while an image-side surface S6 is a convex surface. The fourth lens E4 has a negative refractive power, an object-side surface S7 thereof is a concave surface, while an image-side surface S8 is a convex surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

Table 1 shows a table of basic parameters for the camera lens group of Embodiment 1, and units of the curvature radius, the thickness/distance and the focal length are all millimeter (mm).

TABLE 1

| Surface number | Surface type | Curvature radius | Thickness/distance | Material Refractive index | Material Abbe number | Focal length | Conic coefficient |
|---|---|---|---|---|---|---|---|
| OBJ | Spherical | Infinite | Infinite | | | | |
| S1 | Aspheric | −3.9137 | 0.3359 | 1.68 | 19.2 | 294.81 | −39.0690 |
| S2 | Aspheric | −3.9715 | 0.0120 | | | | −50.5628 |
| S3 | Aspheric | 1.9336 | 0.4861 | 1.55 | 56.1 | 9.98 | −1.0524 |
| S4 | Aspheric | 2.7317 | 0.1926 | | | | −18.5904 |
| STO | Spherical | Infinite | 0.2611 | | | | |
| S5 | Aspheric | 14.0250 | 0.5860 | 1.55 | 56.1 | 6.65 | −83.1724 |
| S6 | Aspheric | −4.8308 | 0.3656 | | | | 12.8948 |

TABLE 1-continued

| Surface number | Surface type | Curvature radius | Thickness/ distance | Material Refractive index | Abbe number | Focal length | Conic coefficient |
|---|---|---|---|---|---|---|---|
| S7  | Aspheric  | −4.6708  | 0.3328 | 1.68 | 19.2 | −7.48 | 6.7305 |
| S8  | Aspheric  | −61.0212 | 0.4215 |      |      |       | −92.2186 |
| S9  | Aspheric  | −5.9778  | 0.9176 | 1.55 | 56.1 | 2.34  | 8.3270 |
| S10 | Aspheric  | −1.1089  | 0.1819 |      |      |       | −2.0436 |
| S11 | Aspheric  | 4.4526   | 0.6431 | 1.54 | 55.9 | −2.53 | −99.0000 |
| S12 | Aspheric  | 0.9870   | 0.8552 |      |      |       | −4.8712 |
| S13 | Spherical | Infinite | 0.2100 | 1.52 | 64.2 |       |        |
| S14 | Spherical | Infinite | 0.4887 |      |      |       |        |
| S15 | Spherical | Infinite |        |      |      |       |        |

In the example, a total effective focal length f of the camera lens group is 4.01 mm, a TTL (i.e., a distance from the object-side surface S1 of the first lens E1 to the imaging surface S15 of the camera lens group on an optical axis) of the camera lens group is 6.29 mm, ImgH is a half of a diagonal length of an effective pixel region on the imaging surface S15 of the camera lens group, ImgH is 4.77 mm, a maximum Semi-FOV of the camera lens group is 51.0°, and an F-number (Fno) of the camera lens group is 1.89.

In Embodiment 1, both the object-side surface and image-side surface of any lens in the first lens E1 to the sixth lens E6 are aspheric surfaces, and a surface type x of each aspheric lens may be defined through, but not limited to, the following aspheric surface formula:

$$x = \frac{ch^2}{1 + \sqrt{1 - (k+1)c^2h^2}} + \sum A_i h^i, \quad (1)$$

wherein x is a distance vector height from a vertex of the aspheric surface when the aspheric surface is at a height of h along the optical axis direction; c is a paraxial curvature of the aspheric surface, c=1/R (namely, the paraxial curvature c is a reciprocal of the curvature radius R in Table 1); k is a conic coefficient; and Ai is a correction coefficient of the i-th order of the aspheric surface. Table 2 shows higher-order coefficients A4, A6, A8, A10, A12, A14, A16, A18 and A20 that can be used for each of the aspheric mirror surfaces S1-S12 in Embodiment 1.

TABLE 2

| Surface number | A4 | A6 | A8 | A10 | A12 |
|---|---|---|---|---|---|
| S1  | −7.7027E−04 | 3.4406E−02  | −4.7716E−02 | 4.2551E−02  | −2.4737E−02 |
| S2  | −1.6055E−02 | 8.5733E−02  | −1.3947E−01 | 1.5256E−01  | −1.1020E−01 |
| S3  | −2.2950E−02 | 4.9012E−02  | −7.4259E−02 | 3.2920E−02  | 1.2496E−01  |
| S4  | 3.3611E−02  | −9.8705E−03 | −1.3700E−01 | 5.9546E−01  | −1.3225E+00 |
| S5  | −3.7162E−02 | 5.7737E−02  | −4.0710E−01 | 1.2945E+00  | −2.5529E+00 |
| S6  | −6.9317E−02 | −2.9752E−02 | 1.6593E−01  | −5.5572E−01 | 1.0429E+00  |
| S7  | −1.8856E−01 | 6.9616E−02  | −7.9044E−02 | 9.3475E−02  | −3.0009E−02 |
| S8  | −1.3647E−01 | 6.1378E−02  | −2.2097E−02 | −3.0487E−03 | 2.6265E−02  |
| S9  | 1.7666E−03  | −5.7076E−02 | 9.9880E−02  | −1.1142E−01 | 8.0611E−02  |
| S10 | 1.7542E−02  | −5.1889E−02 | 4.4886E−02  | −2.3725E−02 | 7.3532E−03  |
| S11 | −6.0645E−02 | 2.8029E−02  | −9.2620E−03 | 2.0934E−03  | −3.0677E−04 |
| S12 | −4.7297E−02 | 1.8615E−02  | −5.2956E−03 | 1.0115E−03  | −1.2910E−04 |

| Surface number | A14 | A16 | A18 | A20 |
|---|---|---|---|---|
| S1  | 9.1920E−03  | −2.0960E−03 | 2.6626E−04  | −1.4382E−05 |
| S2  | 5.1197E−02  | −1.4640E−02 | 2.3354E−03  | −1.5847E−04 |
| S3  | −2.5995E−01 | 2.2287E−01  | −9.2952E−02 | 1.5600E−02  |
| S4  | 1.7576E+00  | −1.3807E+00 | 5.8986E−01  | −1.0353E−01 |
| S5  | 3.0983E+00  | −2.2601E+00 | 9.0112E−01  | −1.4892E−01 |
| S6  | −1.1688E+00 | 7.7986E−01  | 2.8744E−01  | 4.5292E−02  |
| S7  | −7.2487E−04 | −9.8419E−03 | 1.0488E−02  | −2.6182E−03 |
| S8  | −2.5273E−02 | 1.0934E−02  | −2.2486E−03 | 1.7791E−04  |
| S9  | −3.6395E−02 | 9.8457E−03  | −1.4565E−03 | 9.0639E−05  |
| S10 | −7.8082E−04 | −1.5045E−04 | 4.4643E−05  | −3.0676E−06 |
| S11 | 2.8656E−05  | −1.6516E−06 | 5.3688E−08  | −7.5487E−10 |
| S12 | 1.0790E−05  | −5.6320E−07 | 1.6471E−08  | −2.0898E−10 |

Figure 2A:
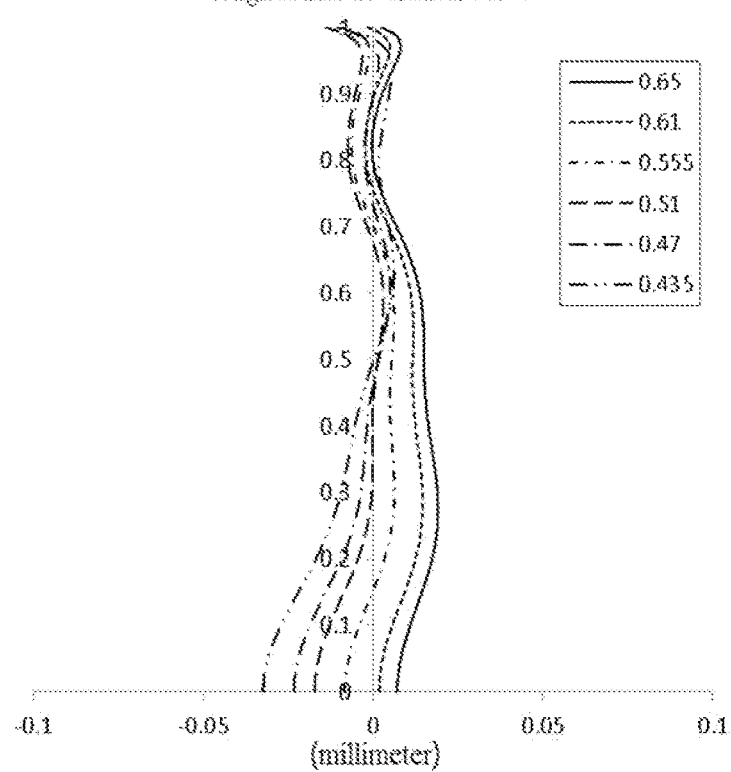
FIGS. 2A-2C show a longitudinal aberration curve, an astigmatism curve, and a distortion curve of a camera lens group according to Embodiment 1 respectively.
Figure 2B:
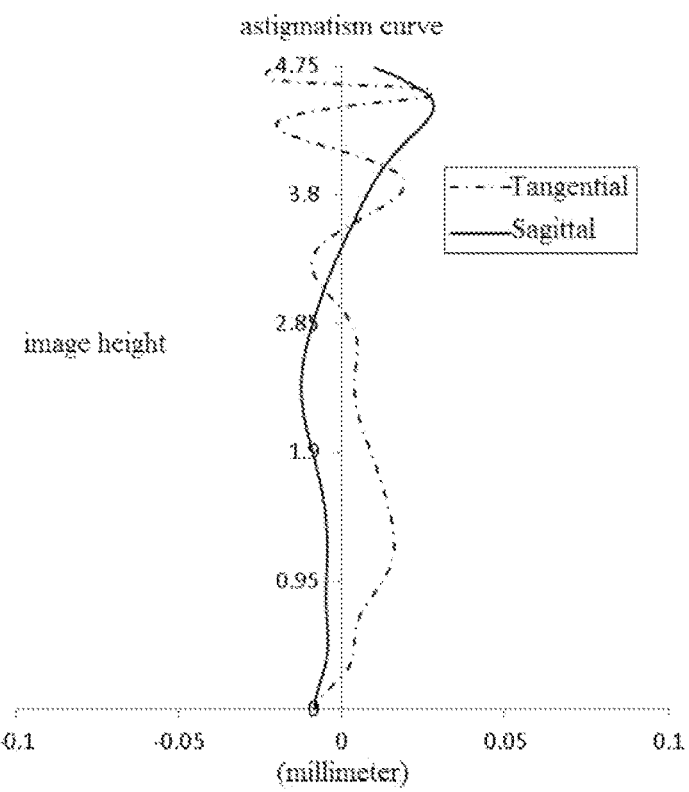
Figure 2C:
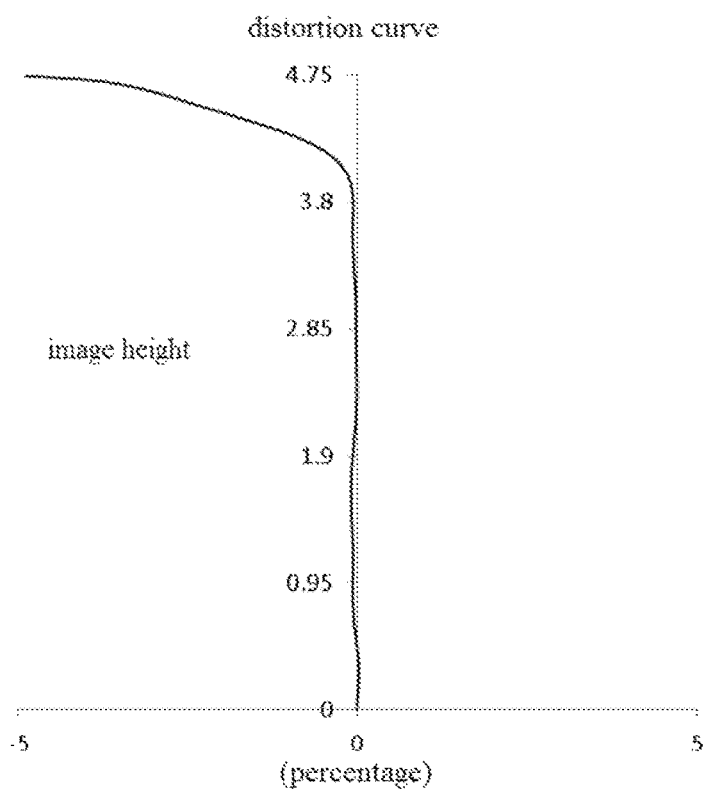

FIG. 2A shows a longitudinal aberration curve of the camera lens group according to Embodiment 1 to represent deviation of a convergence focal point after light of different wavelengths passes through the lens. FIG. 2B shows an astigmatism curve of the camera lens group according to Embodiment 1 to represent a tangential image surface curvature and a sagittal image surface curvature. FIG. 2C shows a distortion curve of the camera lens group according to Embodiment 1 to represent distortion values corresponding to different image heights. According to FIGS. 2A-2C, it can be seen that the camera lens group provided in Embodiment 1 may achieve high imaging quality.

Embodiment 2

Figure 3:
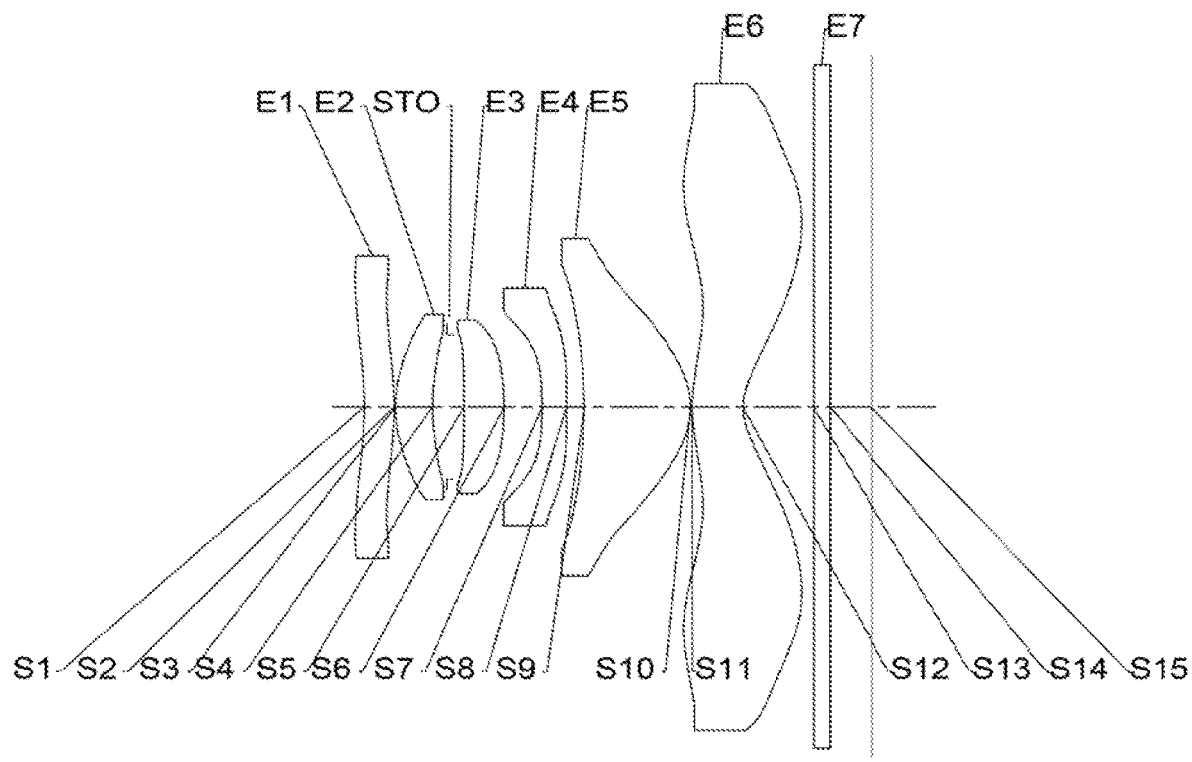
FIG. 3 shows a structure diagram of a camera lens group according to Embodiment 2 of the disclosure.

A camera lens group according to Embodiment 2 of the disclosure will be described below with reference to FIGS. 3-4C. In the present embodiment and the following embodiments, part of descriptions similar to Embodiment 1 will be omitted for simplicity. FIG. 3 is a structure diagram of a camera lens group according to Embodiment 2 of the disclosure.

As shown in FIG. 3, the camera lens group sequentially includes, from an object side to an image side, a first lens E1, a second lens E2, a diaphragm STO, a third lens E3, a fourth lens E4, a fifth lens E5, a sixth lens E6, an optical filter E7, and an imaging surface S15.

The first lens E1 has a negative refractive power, an object-side surface S1 thereof is a concave surface, while an image-side surface S2 is a convex surface. The second lens E2 has a positive refractive power, an object-side surface S3 thereof is a convex surface, while an image-side surface S4 is a concave surface. The third lens E3 has a positive refractive power, an object-side surface S5 thereof is a concave surface, while an image-side surface S6 is a convex surface. The fourth lens E4 has a negative refractive power, an object-side surface S7 thereof is a concave surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

In the example, a total effective focal length f of the camera lens group is 3.72 mm, a TTL (i.e., a distance from the object-side surface S1 of the first lens E1 to the imaging surface S15 of the camera lens group on an optical axis) of the camera lens group is 6.38 mm, ImgH is a half of a diagonal length of an effective pixel region on the imaging surface S15 of the camera lens group, ImgH is 4.77 mm, a maximum Semi-FOV of the camera lens group is 56.4°, and an F-number (Fno) of the camera lens group is 1.82.

Table 3 shows a table of basic parameters for the camera lens group of Embodiment 2, and units of the curvature radius, the thickness/distance and the focal length are all millimeter (mm). Table 4 shows high-order coefficients applied to each aspheric mirror surface in Embodiment 2. A surface type of each aspheric surface may be defined by formula (1) given in Embodiment 1.

TABLE 3

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | −4.4350 | 0.3721 | 1.68 | 19.2 | −499.95 | −32.8556 |
| S2 | Aspheric | −4.6462 | 0.0120 | | | | −42.8162 |
| S3 | Aspheric | 2.0459 | 0.4647 | 1.55 | 56.1 | 8.40 | −1.1814 |
| S4 | Aspheric | 3.3968 | 0.1790 | | | | −23.7391 |
| STO | Spherical | Infinite | 0.2201 | | | | |
| S5 | Aspheric | −300.0000 | 0.5044 | 1.55 | 56.1 | 8.09 | 99.0000 |
| S6 | Aspheric | −4.3555 | 0.4782 | | | | 11.0268 |
| S7 | Aspheric | −5.4817 | 0.3044 | 1.68 | 19.2 | −7.45 | 11.2169 |
| S8 | Aspheric | 64.9316 | 0.2274 | | | | −61.6847 |
| S9 | Aspheric | −6.6054 | 1.3385 | 1.55 | 56.1 | 2.26 | 8.5864 |
| S10 | Aspheric | −1.1127 | 0.0166 | | | | −2.1326 |
| S11 | Aspheric | 2.2499 | 0.6407 | 1.54 | 55.9 | −2.90 | −19.3987 |
| S12 | Aspheric | 0.8294 | 0.8885 | | | | −3.7906 |
| S13 | Spherical | Infinite | 0.2100 | 1.52 | 64.2 | | |
| S14 | Spherical | Infinite | 0.5222 | | | | |
| S15 | Spherical | Infinite | | | | | |

TABLE 4

| Surface number | A4 | A6 | A8 | A10 | A12 |
|---|---|---|---|---|---|
| S1 | 1.0417E−02 | −4.4688E−03 | 6.5636E−03 | −5.7944E−03 | 3.1450E−03 |
| S2 | 2.6664E−03 | 9.2732E−03 | −3.5982E−03 | −2.8861E−03 | 4.5331E−03 |
| S3 | −1.2806E−02 | 1.1498E−02 | 1.5036E−03 | −1.1393E−02 | 5.0579E−04 |
| S4 | 2.7785E−02 | −1.6380E−02 | −1.0991E−02 | 5.3117E−02 | −1.3289E−01 |
| S5 | −3.3178E−02 | −1.6439E−02 | −7.8706E−03 | 4.6864E−02 | −2.0365E−01 |
| S6 | −4.7855E−02 | 1.3033E−02 | −6.7893E−02 | 1.0250E−01 | −5.6700E−02 |
| S7 | −1.6620E−01 | 1.2065E−01 | −3.0309E−01 | 5.6828E−01 | −7.3868E−01 |

TABLE 4-continued

| | | | | | |
|---|---|---|---|---|---|
| S8 | −1.3560E−01 | 1.2961E−01 | −1.5244E−01 | 1.3298E−01 | −7.6946E−02 |
| S9 | −4.5487E−03 | 3.0156E−02 | −2.5716E−02 | 8.3148E−03 | 1.5832E−03 |
| S10 | 1.1744E−02 | −3.0912E−02 | 1.9607E−02 | −7.1479E−03 | 1.5758E−03 |
| S11 | −2.3297E−02 | −1.8598E−03 | 1.2592E−03 | −1.6041E−04 | 7.3495E−06 |
| S12 | −3.3566E−02 | 9.6624E−03 | −2.3550E−03 | 4.1036E−04 | −4.8598E−05 |

| Surface number | A14 | A16 | A18 | A20 |
|---|---|---|---|---|
| S1 | −1.0609E−03 | 2.1567E−04 | −2.4084E−05 | 1.1305E−06 |
| S2 | −2.5946E−03 | 7.7635E−04 | −1.1964E−04 | 7.4801E−06 |
| S3 | 1.4775E−02 | −1.4422E−02 | 5.3607E−03 | −5.6325E−04 |
| S4 | 2.3038E−01 | −2.4002E−01 | 1.3446E−01 | −3.0037E−02 |
| S5 | 4.0565E−01 | −4.3410E−01 | 2.3542E−01 | −5.0519E−02 |
| S6 | −5.1142E−02 | 9.9959E−02 | −5.8757E−02 | 1.2426E−02 |
| S7 | 6.5286E−01 | −3.5809E−01 | 1.0913E−01 | −1.4189E−02 |
| S8 | 2.9706E−02 | −7.3653E−03 | 1.0627E−03 | −6.7673E−05 |
| S9 | −2.2947E−03 | 8.1200E−04 | −1.3241E−04 | 8.5362E−06 |
| S10 | −8.7143E−05 | −3.7365E−05 | 7.4399E−06 | −4.1109E−07 |
| S11 | 1.8118E−07 | −3.4834E−08 | 1.4450E−09 | −2.1063E−11 |
| S12 | 3.7070E−06 | −1.7137E−07 | 4.3413E−09 | −4.6188E−11 |

Figure 4A:
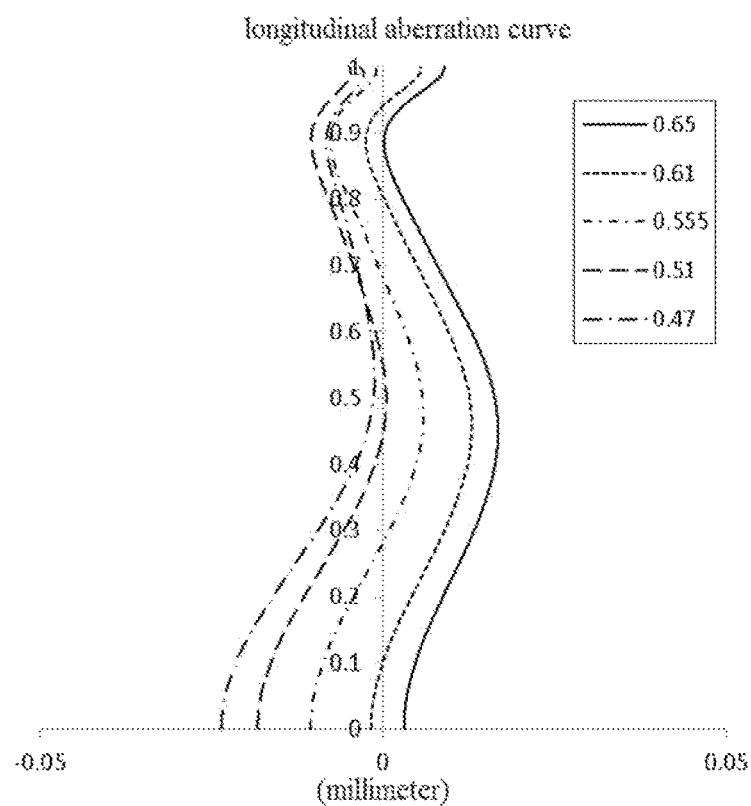
FIGS. 4A-4C show a longitudinal aberration curve, an astigmatism curve, and a distortion curve of a camera lens group according to Embodiment 2 respectively.
Figure 4B:
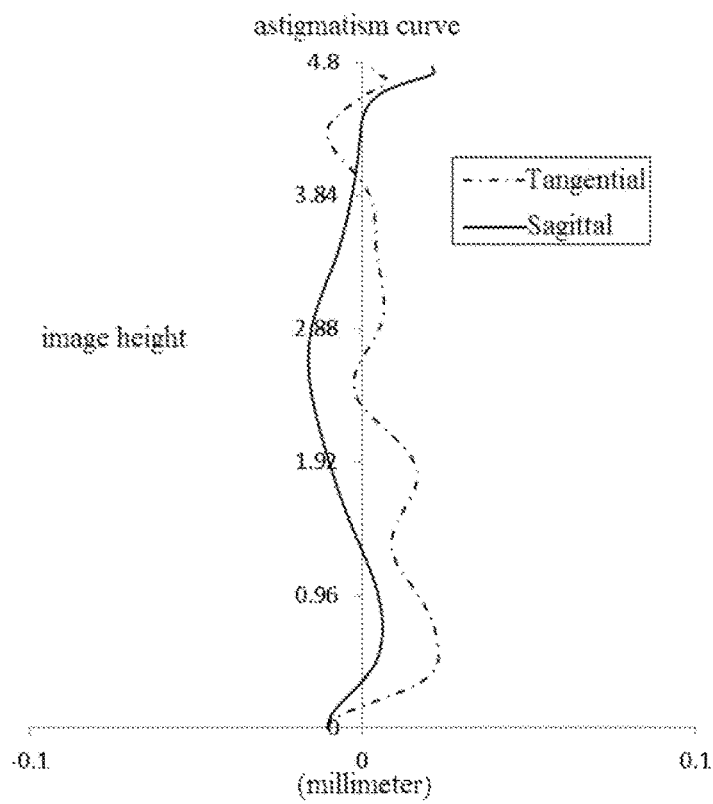
Figure 4C:
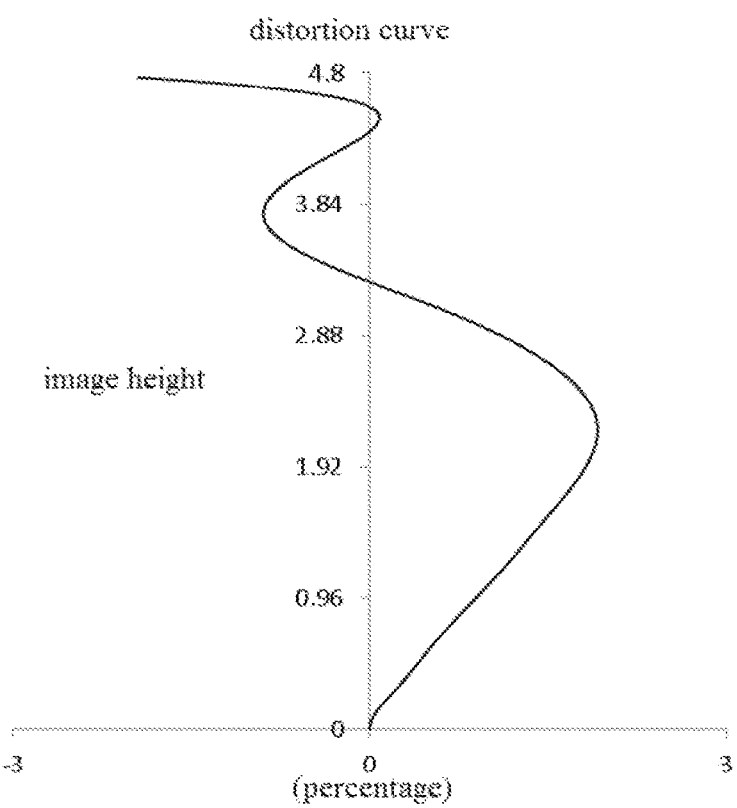

FIG. 4A shows a longitudinal aberration curve of the camera lens group according to Embodiment 2 to represent deviation of a convergence focal point after light of different wavelengths passes through the lens. FIG. 4B shows an astigmatism curve of the camera lens group according to Embodiment 2 to represent a tangential image surface curvature and a sagittal image surface curvature. FIG. 4C shows a distortion curve of the camera lens group according to Embodiment 2 to represent distortion values corresponding to different image heights. According to FIGS. 4A-4C, it can be seen that the camera lens group provided in Embodiment 2 may achieve high imaging quality.

Embodiment 3

Figure 5:
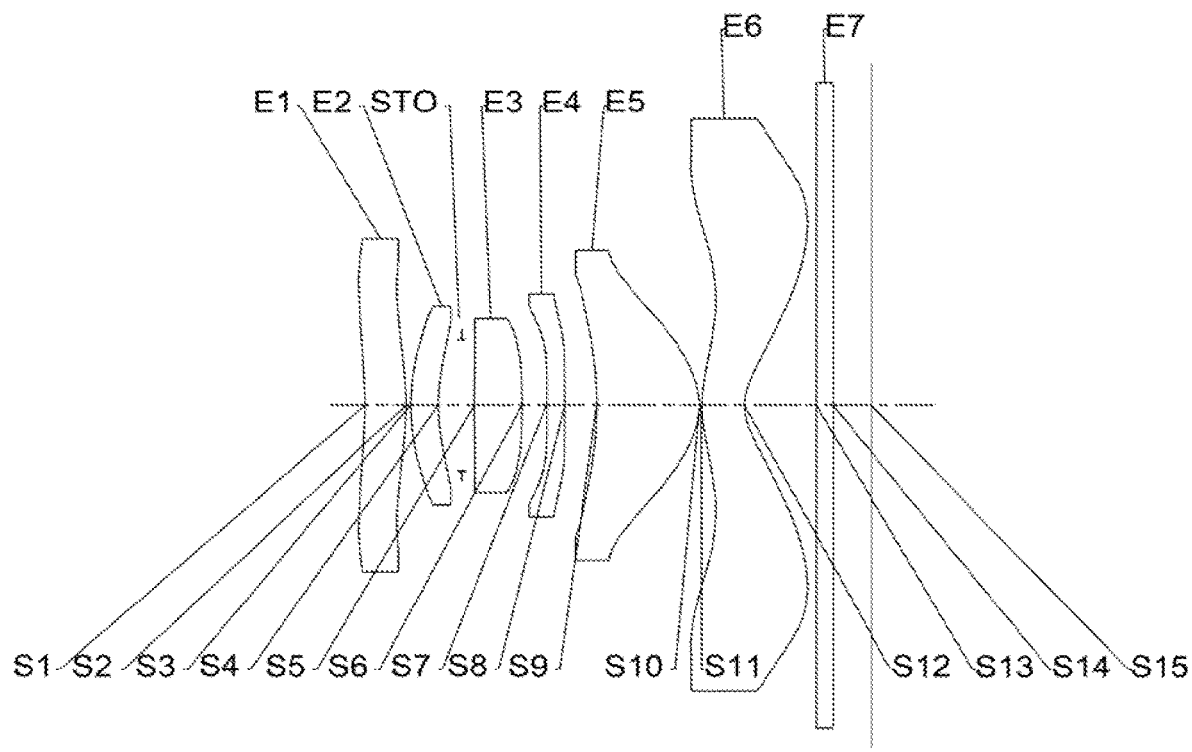
FIG. 5 shows a structure diagram of a camera lens group according to Embodiment 3 of the disclosure.

A camera lens group according to Embodiment 3 of the disclosure will be described below with reference to FIGS. 5-6C. FIG. 5 is a structure diagram of a camera lens group according to Embodiment 3 of the disclosure.

As shown in FIG. 5, the camera lens group sequentially includes, from an object side to an image side, a first lens E1, a second lens E2, a diaphragm STO, a third lens E3, a fourth lens E4, a fifth lens E5, a sixth lens E6, an optical filter E7, and an imaging surface S15.

The first lens E1 has a positive refractive power, an object-side surface S1 thereof is a concave surface, while an image-side surface S2 is a convex surface. The second lens E2 has a negative refractive power, an object-side surface S3 thereof is a convex surface, while an image-side surface S4 is a concave surface. The third lens E3 has a positive refractive power, an object-side surface S5 thereof is a convex surface, while an image-side surface S6 is a convex surface. The fourth lens E4 has a positive refractive power, an object-side surface S7 thereof is a convex surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

In the example, a total effective focal length f of the camera lens group is 3.31 mm, a TTL (i.e., a distance from the object-side surface S1 of the first lens E1 to the imaging surface S15 of the camera lens group on an optical axis) of the camera lens group is 6.35 mm, ImgH is a half of a diagonal length of an effective pixel region on the imaging surface S15 of the camera lens group, ImgH is 4.64 mm, a maximum Semi-FOV of the camera lens group is 54.3°, and an F-number (Fno) of the camera lens group is 1.78.

Table 5 shows a table of basic parameters for the camera lens group of Embodiment 3, and units of the curvature radius, the thickness/distance and the focal length are all millimeter (mm). Table 6 shows high-order coefficients applied to each aspheric mirror surface in Embodiment 3. A surface type of each aspheric surface may be defined by formula (1) given in Embodiment 1.

TABLE 5

| | | | | Material | | | |
|---|---|---|---|---|---|---|---|
| Surface number | Surface type | Curvature radius | Thickness/ distance | Refractive index | Abbe number | Focal length | Conic coefficient |
| OBJ | Spherical | Infinite | Infinite | | | | |
| S1 | Aspheric | −6.3735 | 0.5148 | 1.68 | 19.2 | 11.23 | −43.7258 |
| S2 | Aspheric | −3.5814 | 0.0557 | | | | −49.3113 |
| S3 | Aspheric | 3.3864 | 0.3450 | 1.55 | 56.1 | −47.00 | −0.5261 |
| S4 | Aspheric | 2.8840 | 0.2947 | | | | −25.8568 |
| STO | Spherical | Infinite | 0.1528 | | | | |
| S5 | Aspheric | 11.4367 | 0.6014 | 1.55 | 56.1 | 11.67 | 76.4873 |
| S6 | Aspheric | −14.1201 | 0.3062 | | | | 43.9134 |
| S7 | Aspheric | 12.8801 | 0.2271 | 1.68 | 19.2 | 137.53 | 66.1513 |
| S8 | Aspheric | 14.8394 | 0.4116 | | | | 38.5885 |

TABLE 5-continued

| Surface number | Surface type | Curvature radius | Thickness/ distance | Material Refractive index | Material Abbe number | Focal length | Conic coefficient |
|---|---|---|---|---|---|---|---|
| S9 | Aspheric | −5.4282 | 1.2865 | 1.55 | 56.1 | 2.19 | 7.7834 |
| S10 | Aspheric | −1.0624 | 0.0266 | | | | −2.1064 |
| S11 | Aspheric | 1.7557 | 0.5341 | 1.54 | 55.9 | −2.74 | −18.7699 |
| S12 | Aspheric | 0.7215 | 0.9029 | | | | −3.6581 |
| S13 | Spherical | Infinite | 0.2100 | 1.52 | 64.2 | | |
| S14 | Spherical | Infinite | 0.4813 | | | | |
| S15 | Spherical | Infinite | | | | | |

TABLE 6

| Surface number | A4 | A6 | A8 | A10 | A12 |
|---|---|---|---|---|---|
| S1 | 7.2445E−03 | 3.9413E−03 | −4.7642E−03 | 2.9941E−03 | −1.1716E−03 |
| S2 | 2.0248E−03 | 5.4712E−03 | −2.3041E−03 | 7.9395E−05 | 5.0941E−04 |
| S3 | 6.9181E−02 | −2.4251E−01 | 4.9582E−01 | −7.4001E−01 | 7.7819E−01 |
| S4 | 3.1185E−02 | −3.4309E−02 | −3.4107E−02 | 1.6173E−01 | −1.9598E−01 |
| S5 | −1.9268E−02 | −6.3716E−02 | 2.3022E−01 | −7.2143E−01 | 1.5451E+00 |
| S6 | −7.5659E−02 | 1.4565E−01 | −5.6015E−01 | 1.2653E+00 | −1.8880E+00 |
| S7 | −2.0707E−01 | 5.0002E−01 | −1.3604E+00 | 2.3243E+00 | −2.6790E+00 |
| S8 | −1.5243E−01 | 3.1644E−01 | −6.0245E−01 | 7.3665E−01 | −6.1968E−01 |
| S9 | −2.5189E−03 | −2.1956E−02 | 1.0073E−01 | −1.3416E−01 | 9.8847E−02 |
| S10 | 9.1350E−03 | −2.4820E−03 | −3.4522E−02 | 4.3300E−02 | −2.5883E−02 |
| S11 | −9.9048E−03 | −9.7775E−03 | 3.9524E−03 | −7.4291E−04 | 8.4355E−05 |
| S12 | −3.1639E−02 | 9.1952E−03 | −2.5257E−03 | 5.0973E−04 | −6.8649E−05 |

| Surface number | A14 | A16 | A18 | A20 |
|---|---|---|---|---|
| S1 | 2.9508E−04 | −4.6776E−05 | 4.2445E−06 | −1.6714E−07 |
| S2 | −3.0129E−04 | 8.3574E−05 | −1.1948E−05 | 7.2743E−07 |
| S3 | −5.4955E−01 | 2.4624E−01 | −6.3151E−02 | 7.0910E−03 |
| S4 | 6.2015E−02 | 7.4550E−02 | −7.4929E−02 | 2.0561E−02 |
| S5 | −2.1605E+00 | 1.8637E+00 | −9.0276E−01 | 1.8767E−01 |
| S6 | 1.8387E+00 | −1.1089E+00 | 3.7259E−01 | −5.3198E−02 |
| S7 | 2.0481E+00 | −9.6991E−01 | 2.5450E−01 | −2.8163E−02 |
| S8 | 3.5968E−01 | −1.3405E−01 | 2.8304E−02 | −2.5485E−03 |
| S9 | −4.4568E−02 | 1.2317E−02 | −1.9269E−03 | 1.3125E−04 |
| S10 | 9.0991E−03 | −1.8923E−03 | 2.1444E−04 | −1.0199E−05 |
| S11 | −5.9698E−06 | 2.5356E−07 | −5.7949E−09 | 5.2752E−11 |
| S12 | 5.7554E−06 | −2.8500E−07 | 7.6193E−09 | −8.4928E−11 |

Figure 6A:
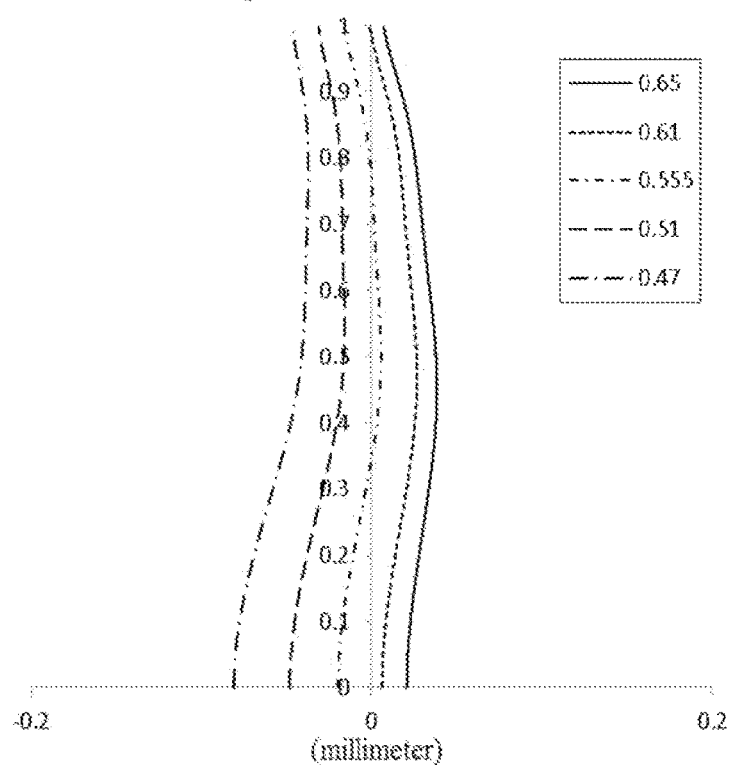
FIGS. 6A-6C show a longitudinal aberration curve, an astigmatism curve, and a distortion curve of a camera lens group according to Embodiment 3 respectively.
Figure 6B:
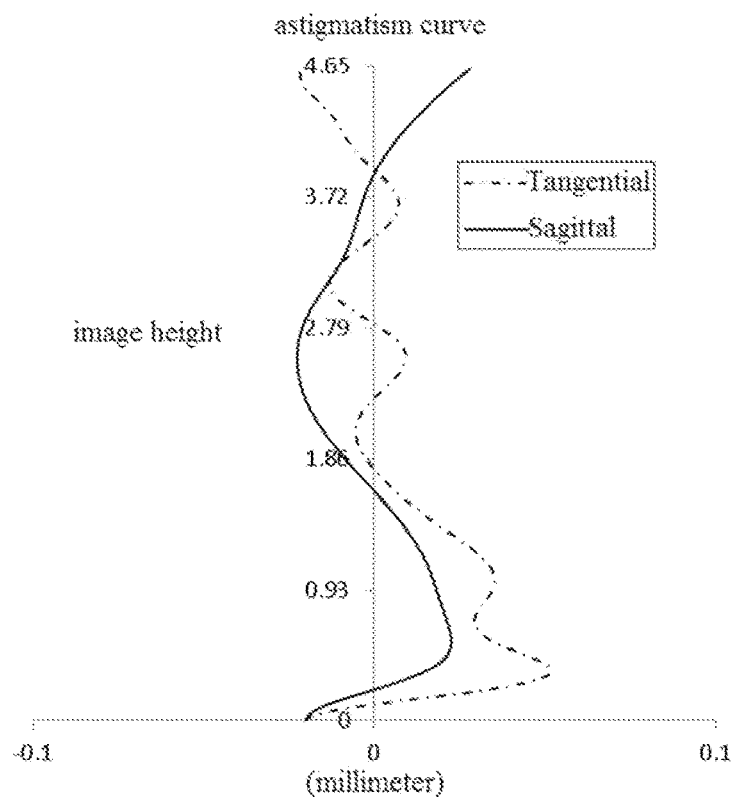
Figure 6C:
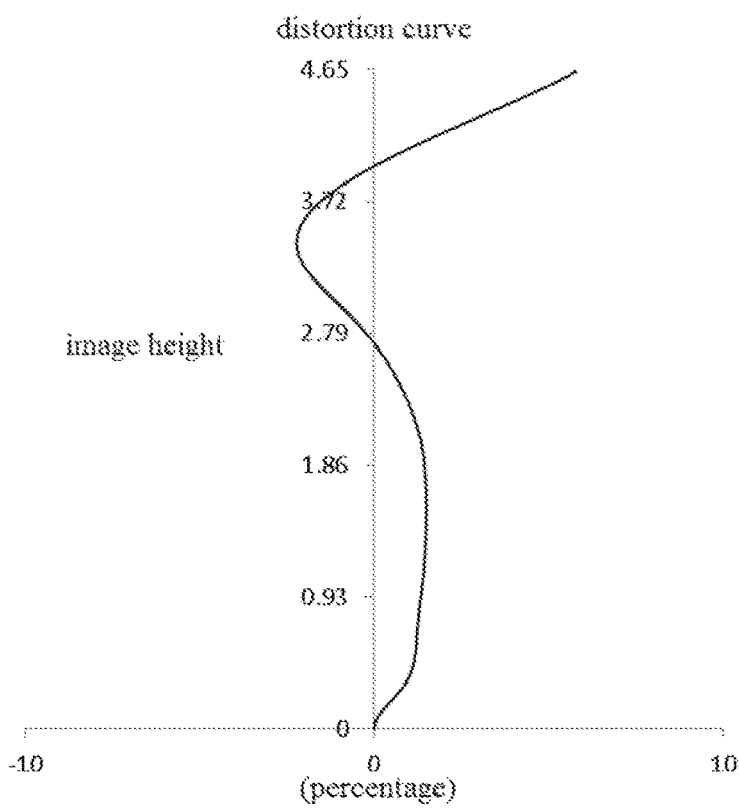

FIG. 6A shows a longitudinal aberration curve of the camera lens group according to Embodiment 3 to represent deviation of a convergence focal point after light of different wavelengths passes through the lens. FIG. 6B shows an astigmatism curve of the camera lens group according to Embodiment 3 to represent a tangential image surface curvature and a sagittal image surface curvature. FIG. 6C shows a distortion curve of the camera lens group according to Embodiment 3 to represent distortion values corresponding to different image heights. According to FIGS. 6A-6C, it can be seen that the camera lens group provided in Embodiment 3 may achieve high imaging quality.

Embodiment 4

Figure 7:
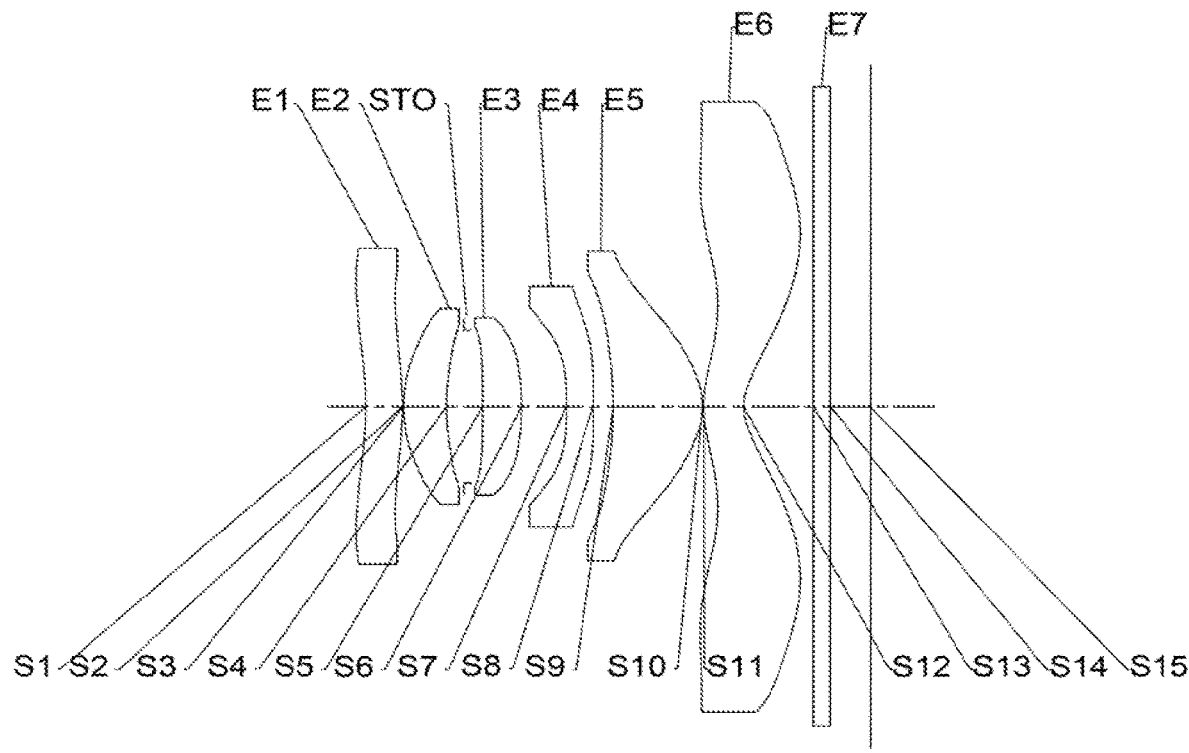
FIG. 7 shows a structure diagram of a camera lens group according to Embodiment 4 of the disclosure.

A camera lens group according to Embodiment 4 of the disclosure will be described below with reference to FIGS. 7-8C. FIG. 7 is a structure diagram of a camera lens group according to Embodiment 4 of the disclosure.

As shown in FIG. 7, the camera lens group sequentially includes, from an object side to an image side, a first lens E1, a second lens E2, a diaphragm STO, a third lens E3, a fourth lens E4, a fifth lens E5, a sixth lens E6, an optical filter E7, and an imaging surface S15.

The first lens E1 has a negative refractive power, an object-side surface S1 thereof is a concave surface, while an image-side surface S2 is a convex surface. The second lens E2 has a positive refractive power, an object-side surface S3 thereof is a convex surface, while an image-side surface S4 is a concave surface. The third lens E3 has a positive refractive power, an object-side surface S5 thereof is a concave surface, while an image-side surface S6 is a convex surface. The fourth lens E4 has a negative refractive power, an object-side surface S7 thereof is a concave surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

In the example, a total effective focal length f of the camera lens group is 3.69 mm, a TTL (i.e., a distance from the object-side surface S1 of the first lens E1 to the imaging surface S15 of the camera lens group on an optical axis) of the camera lens group is 6.32 mm, ImgH is a half of a diagonal length of an effective pixel region on the imaging surface r15 of the camera lens group, ImgH is 4.77 mm, a maximum Semi-FOV of the camera lens group is 51.8°, and an F-number (Fno) of the camera lens group is 1.70.

Table 7 shows a table of basic parameters for the camera lens group of Embodiment 4, and units of the curvature radius, the thickness/distance and the focal length are all millimeter (mm). Table 8 shows high-order coefficients applied to each aspheric mirror surface in Embodiment 4. A surface type of each aspheric surface may be defined by formula (1) given in Embodiment 1.

TABLE 7

| Surface number | Surface type | Curvature radius | Thickness/ distance | Refractive index | Abbe number | Focal length | Conic coefficient |
|---|---|---|---|---|---|---|---|
| OBJ | Spherical | Infinite | Infinite | | | | |
| S1 | Aspheric | −4.2518 | 0.4561 | 1.68 | 19.2 | −190.78 | −30.6218 |
| S2 | Aspheric | −4.5869 | 0.0120 | | | | −43.3750 |
| S3 | Aspheric | 2.0095 | 0.5367 | 1.55 | 56.1 | 7.76 | −1.0643 |
| S4 | Aspheric | 3.4623 | 0.2173 | | | | −24.4455 |
| STO | Spherical | Infinite | 0.2374 | | | | |
| S5 | Aspheric | −131.7011 | 0.4887 | 1.55 | 56.1 | 8.42 | 99.0000 |
| S6 | Aspheric | −4.4471 | 0.5631 | | | | 10.7321 |
| S7 | Aspheric | −6.1799 | 0.3348 | 1.68 | 19.2 | −7.44 | 10.2268 |
| S8 | Aspheric | 28.0024 | 0.2558 | | | | −99.0000 |
| S9 | Aspheric | −6.4102 | 1.1205 | 1.55 | 56.1 | 2.17 | 8.5598 |
| S10 | Aspheric | −1.0608 | 0.0100 | | | | −2.3229 |
| S11 | Aspheric | 1.6954 | 0.5000 | 1.54 | 55.9 | −2.85 | −14.7973 |
| S12 | Aspheric | 0.7208 | 0.8740 | | | | −3.7329 |
| S13 | Spherical | Infinite | 0.2100 | 1.52 | 64.2 | | |
| S14 | Spherical | Infinite | 0.5077 | | | | |
| S15 | Spherical | Infinite | | | | | |

TABLE 8

| Surface number | A4 | A6 | A8 | A10 | A12 |
|---|---|---|---|---|---|
| S1 | 6.6901E−03 | 2.8910E−03 | −9.1109E−04 | −4.7394E−04 | 5.0840E−04 |
| S2 | −2.2293E−03 | 2.1135E−02 | −1.9322E−02 | 1.2285E−02 | −5.6901E−03 |
| S3 | −8.8495E−03 | −6.9466E−03 | 6.0337E−02 | −1.4090E−01 | 1.9447E−01 |
| S4 | 2.4857E−02 | 3.7430E−03 | −1.3410E−01 | 5.0193E−01 | −1.0449E+00 |
| S5 | −3.7303E−02 | −7.8092E−03 | −4.7377E−02 | 1.3668E−01 | −2.4802E−01 |
| S6 | −4.3914E−02 | −2.0292E−02 | 7.4007E−02 | −2.3101E−01 | 4.0617E−01 |
| S7 | −1.6363E−01 | 1.6453E−01 | −4.4855E−01 | 8.2757E−01 | −1.0028E+00 |
| S8 | −1.4268E−01 | 1.6013E−01 | −2.0698E−01 | 1.8153E−01 | −1.0336E−01 |
| S9 | −1.3796E−02 | 4.0858E−02 | −2.1619E−02 | −1.5162E−02 | 2.4196E−02 |
| S10 | 2.6785E−02 | −5.7486E−02 | 4.5636E−02 | −2.2788E−02 | 7.7710E−03 |
| S11 | −1.3084E−02 | −1.4852E−02 | 6.8093E−03 | −1.4022E−03 | 1.7365E−04 |
| S12 | −3.4602E−02 | 7.7204E−03 | −1.5435E−03 | 2.5295E−04 | −3.1976E−05 |

| Surface number | A14 | A16 | A18 | A20 |
|---|---|---|---|---|
| S1 | −1.9121E−04 | 3.5952E−05 | −3.2400E−06 | 1.0291E−07 |
| S2 | 1.9530E−03 | −4.8090E−04 | 7.4388E−05 | −5.2073E−06 |
| S3 | −1.7159E−01 | 9.5346E−02 | −3.0456E−02 | 4.3253E−03 |
| S4 | 1.3135E+00 | −9.7368E−01 | 3.8986E−01 | −6.3823E−02 |
| S5 | 2.6979E−01 | −1.8214E−01 | 7.1735E−02 | −1.2757E−02 |
| S6 | −4.1979E−01 | 2.5244E−01 | −8.1138E−02 | 1.0658E−02 |
| S7 | 8.0221E−01 | −3.9702E−01 | 1.0925E−01 | −1.2812E−02 |
| S8 | 3.8705E−02 | −9.0509E−03 | 1.1761E−03 | −6.3890E−05 |
| S9 | −1.3140E−02 | 3.7107E−03 | −5.4212E−04 | 3.2277E−05 |
| S10 | −1.7456E−03 | 2.5507E−04 | −2.3068E−05 | 9.9721E−07 |
| S11 | −1.3715E−05 | 6.7744E−07 | −1.9056E−08 | 2.3224E−10 |
| S12 | 2.8241E−06 | −1.5675E−07 | 4.8314E−09 | −6.2832E−11 |

Figure 8A:
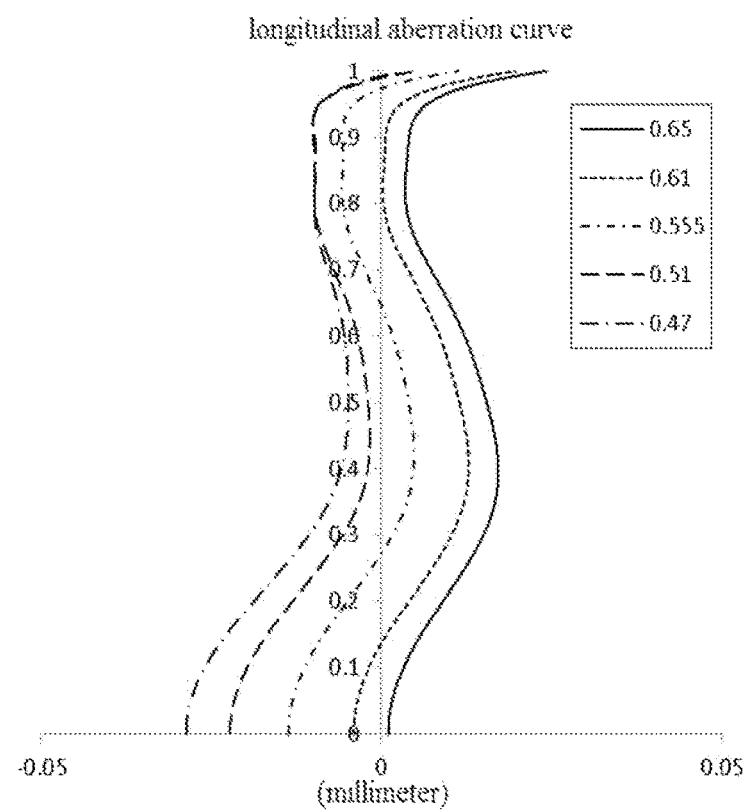
FIGS. 8A-8C show a longitudinal aberration curve, an astigmatism curve, and a distortion curve of a camera lens group according to Embodiment 4 respectively.
Figure 8B:
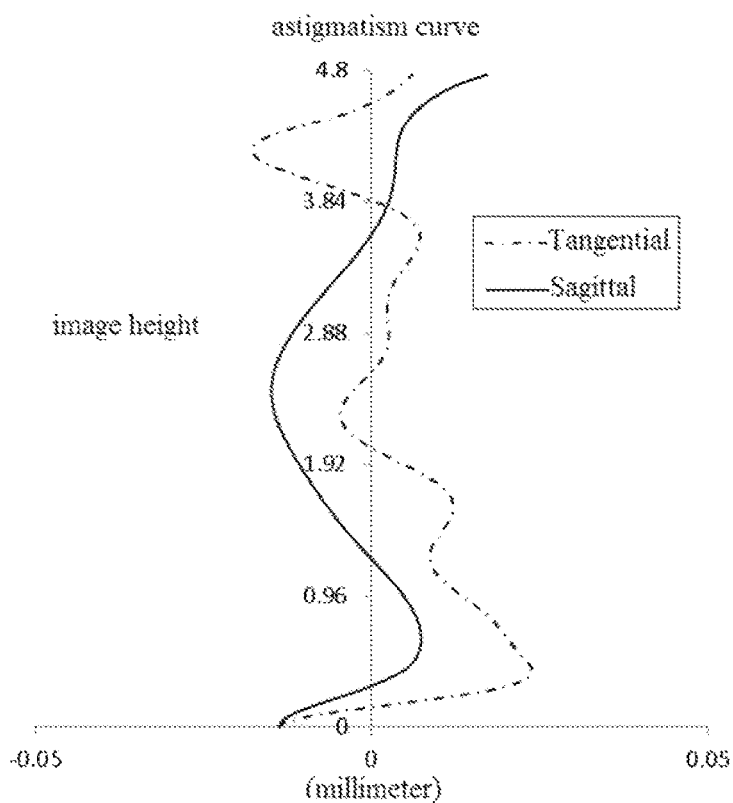
Figure 8C:
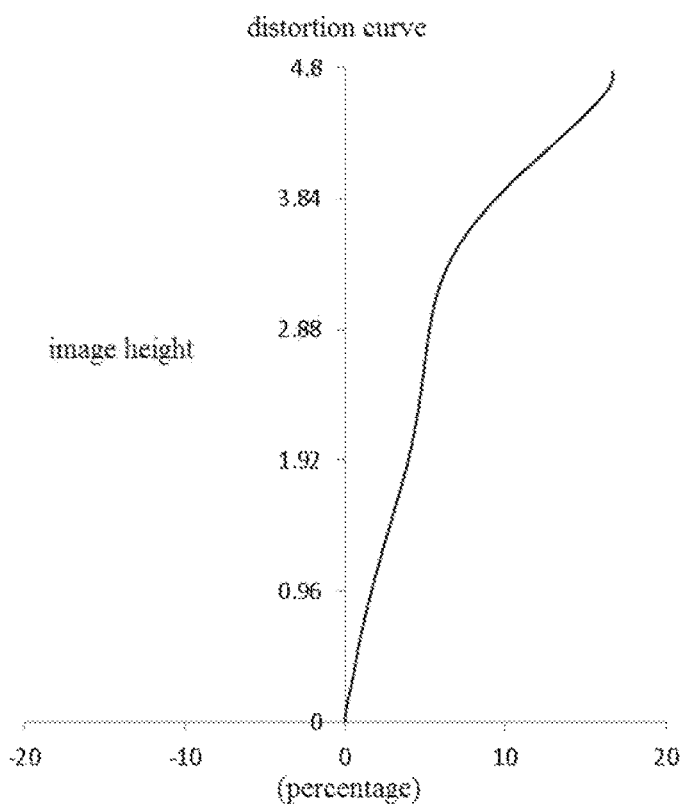

FIG. 8A shows a longitudinal aberration curve of the camera lens group according to Embodiment 4 to represent deviation of a convergence focal point after light of different wavelengths passes through the lens. FIG. 8B shows an astigmatism curve of the camera lens group according to Embodiment 4 to represent a tangential image surface curvature and a sagittal image surface curvature. FIG. 8C shows a distortion curve of the camera lens group according to Embodiment 4 to represent distortion values corresponding to different image heights. According to FIGS. 8A-8C, it can be seen that the camera lens group provided in Embodiment 4 may achieve high imaging quality.

Embodiment 5

Figure 9:
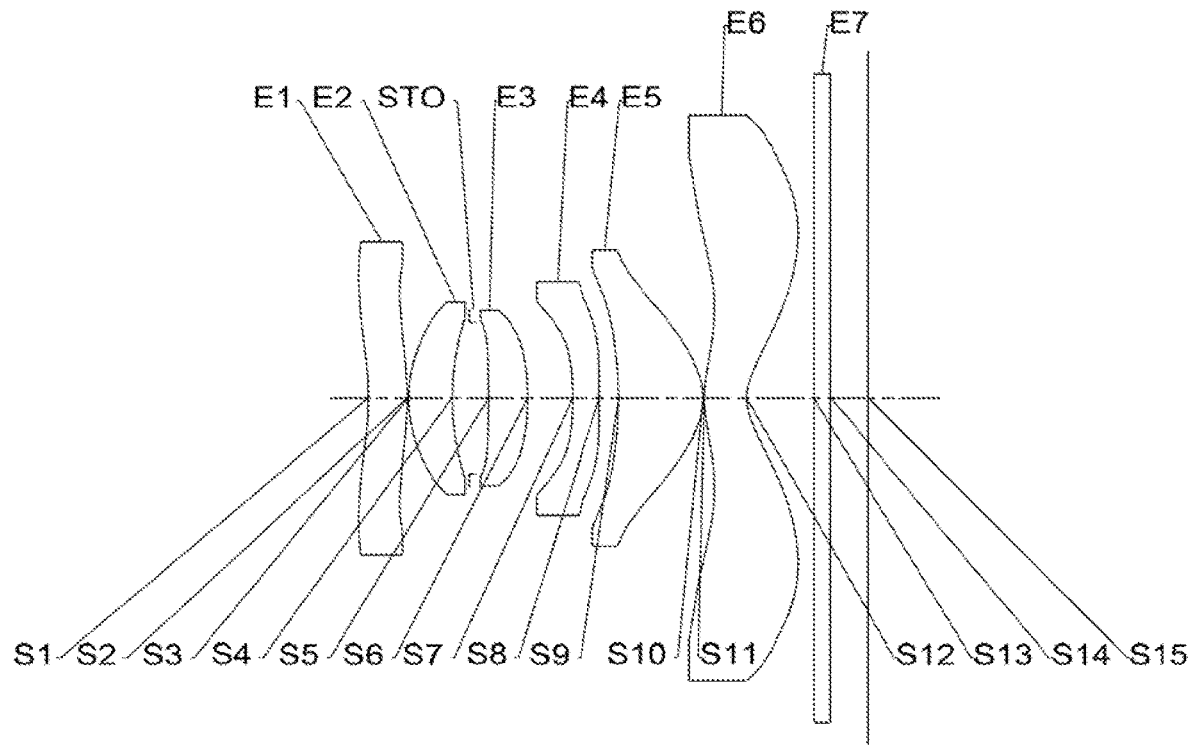
FIG. 9 shows a structure diagram of a camera lens group according to Embodiment 5 of the disclosure.

A camera lens group according to Embodiment 5 of the disclosure will be described below with reference to FIGS. 9-10C. FIG. 9 is a structure diagram of a camera lens group according to Embodiment 5 of the disclosure.

As shown in FIG. 9, the camera lens group sequentially includes, from an object side to an image side, a first lens E1, a second lens E2, a diaphragm STO, a third lens E3, a fourth lens E4, a fifth lens E5, a sixth lens E6, an optical filter E7, and an imaging surface S15.

The first lens E1 has a positive refractive power, an object-side surface S1 thereof is a concave surface, while an image-side surface S2 is a convex surface. The second lens E2 has a positive refractive power, an object-side surface S3 thereof is a convex surface, while an image-side surface S4 is a concave surface. The third lens E3 has a positive refractive power, an object-side surface S5 thereof is a concave surface, while an image-side surface S6 is a convex surface. The fourth lens E4 has a negative refractive power, an object-side surface S7 thereof is a concave surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

In the example, a total effective focal length f of the camera lens group is 3.65 mm, a TTL (i.e., a distance from the object-side surface S1 of the first lens E1 to the imaging surface S15 of the camera lens group on an optical axis) of the camera lens group is 6.23 mm, ImgH is a half of a diagonal length of an effective pixel region on the imaging surface S15 of the camera lens group, ImgH is 4.77 mm, a maximum Semi-FOV of the camera lens group is 51.1°, and an F-number (Fno) of the camera lens group is 1.66.

Table 9 shows a table of basic parameters for the camera lens group of Embodiment 5, and units of the curvature radius, the thickness/distance and the focal length are all millimeter (mm). Table 10 shows high-order coefficients applied to each aspheric mirror surface in Embodiment 5. A surface type of each aspheric surface may be defined by formula (1) given in Embodiment 1.

TABLE 9

| Surface number | Surface type | Curvature radius | Thickness/ distance | Material Refractive index | Abbe number | Focal length | Conic coefficient |
|---|---|---|---|---|---|---|---|
| OBJ | Spherical | Infinite | Infinite | | | | |
| S1 | Aspheric | −4.3782 | 0.4857 | 1.68 | 19.2 | 259.82 | −29.0156 |
| S2 | Aspheric | −4.4634 | 0.0120 | | | | −42.8531 |
| S3 | Aspheric | 2.0317 | 0.5435 | 1.55 | 56.1 | 7.99 | −0.8975 |
| S4 | Aspheric | 3.4445 | 0.2131 | | | | −25.0334 |
| STO | Spherical | Infinite | 0.2412 | | | | |
| S5 | Aspheric | −92.6488 | 0.4883 | 1.55 | 56.1 | 8.57 | −99.0000 |
| S6 | Aspheric | −4.4604 | 0.5627 | | | | 10.6228 |
| S7 | Aspheric | −6.7057 | 0.3306 | 1.68 | 19.2 | −7.53 | 9.5829 |
| S8 | Aspheric | 21.7428 | 0.2446 | | | | −91.4325 |
| S9 | Aspheric | −6.1534 | 1.0527 | 1.55 | 56.1 | 2.16 | 8.5425 |
| S10 | Aspheric | −1.0480 | 0.0100 | | | | −2.3095 |
| S11 | Aspheric | 1.7912 | 0.5270 | 1.54 | 55.9 | −2.72 | −18.2093 |
| S12 | Aspheric | 0.7223 | 0.8371 | | | | −3.9520 |
| S13 | Spherical | Infinite | 0.2100 | 1.52 | 64.2 | | |
| S14 | Spherical | Infinite | 0.4708 | | | | |
| S15 | Spherical | Infinite | | | | | |

TABLE 10

| Surface number | A4 | A6 | A8 | A10 | A12 |
|---|---|---|---|---|---|
| S1 | 5.9920E−03 | 4.2399E−03 | −2.3417E−03 | 7.5485E−04 | −1.9217E−04 |
| S2 | −4.1605E−03 | 2.5321E−02 | −2.4402E−02 | 1.7397E−02 | −9.3072E−03 |
| S3 | −5.7145E−03 | −1.1742E−04 | 2.7124E−02 | −7.8928E−02 | 1.3525E−01 |
| S4 | 2.4488E−02 | −4.1353E−04 | −1.1575E−01 | 4.7821E−01 | −1.0517E+00 |
| S5 | −3.9401E−02 | −5.8901E−03 | −5.6551E−02 | 1.6821E−01 | −3.2179E−01 |
| S6 | −4.4758E−02 | −1.2016E−02 | 2.8143E−02 | −7.9670E−02 | 1.1855E−01 |
| S7 | −1.6131E−01 | 1.2067E−01 | −2.7771E−01 | 4.6419E−01 | −5.3511E−01 |
| S8 | −1.4136E−01 | 1.2689E−01 | −1.2219E−01 | 6.1479E−02 | −8.4359E−04 |
| S9 | 1.8661E−02 | −7.2308E−02 | 1.6612E−01 | −2.0068E−01 | 1.3937E−01 |

TABLE 10-continued

| S10 | 1.4939E−02 | −3.7996E−02 | 1.5393E−02 | 8.9432E−03 | −1.0904E−02 |
| S11 | −5.0805E−02 | 1.4159E−02 | −3.2239E−03 | 6.1699E−04 | −8.5041E−05 |
| S12 | −5.3057E−02 | 2.0729E−02 | −6.1457E−03 | 1.2327E−03 | −1.6332E−04 |

| Surface number | A14 | A16 | A18 | A20 |
|---|---|---|---|---|
| S1 | 5.4363E−05 | −1.4645E−05 | 2.3496E−06 | −1.5128E−07 |
| S2 | 3.5832E−03 | −9.2073E−04 | 1.3870E−04 | −9.1112E−06 |
| S3 | −1.4455E−01 | 9.3507E−02 | −3.3333E−02 | 5.0755E−03 |
| S4 | 1.3679E+00 | −1.0370E+00 | 4.2204E−01 | −7.0215E−02 |
| S5 | 3.9228E−01 | −3.0701E−01 | 1.3897E−01 | −2.7246E−02 |
| S6 | −9.1296E−02 | 3.0320E−02 | 4.3242E−04 | −1.8296E−03 |
| S7 | 4.3744E−01 | −2.2932E−01 | 6.7462E−02 | −8.4534E−03 |
| S8 | −1.4727E−02 | 7.5839E−03 | −1.6605E−03 | 1.3936E−04 |
| S9 | −5.8487E−02 | 1.4688E−02 | −2.0267E−03 | 1.1774E−04 |
| S10 | 4.5399E−03 | −9.5077E−04 | 9.9406E−05 | −4.1001E−06 |
| S11 | 7.9243E−06 | −4.7810E−07 | 1.6876E−08 | −2.6313E−10 |
| S12 | 1.3901E−05 | −7.2498E−07 | 2.1009E−08 | −2.5898E−10 |

Figure 10A:
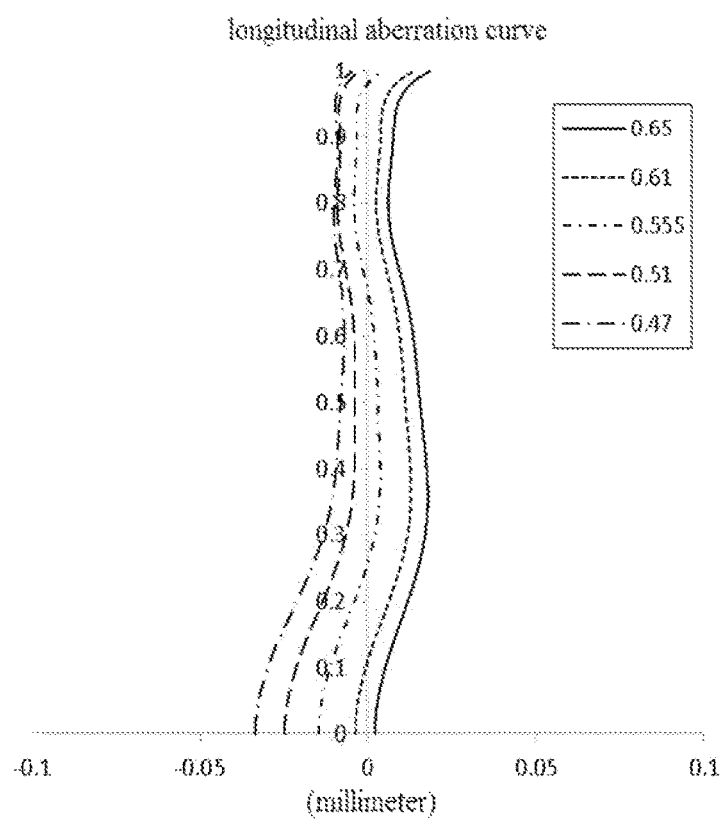
FIGS. 10A-10C show a longitudinal aberration curve, an astigmatism curve, and a distortion curve of a camera lens group according to Embodiment 5 respectively.
Figure 10B:
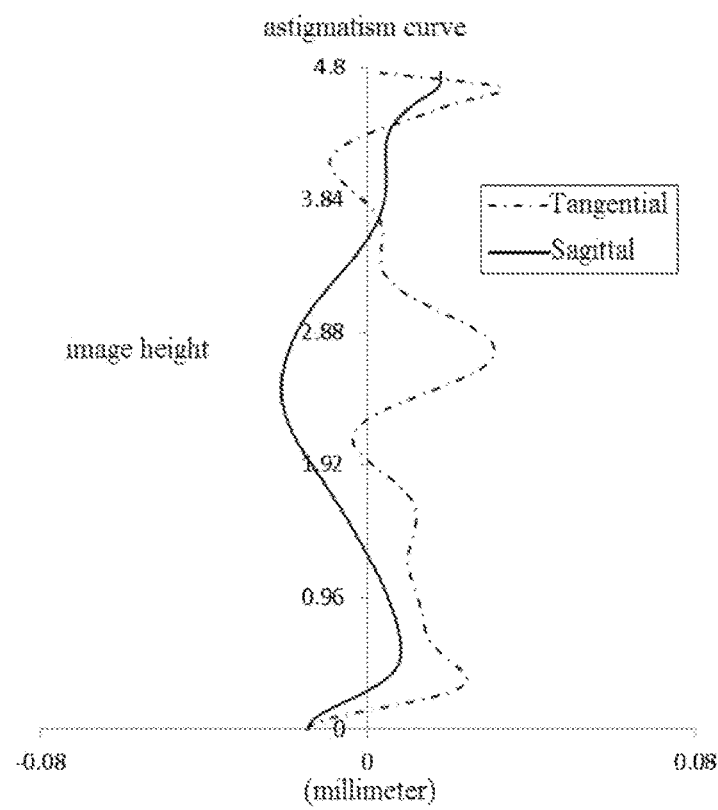
Figure 10C:
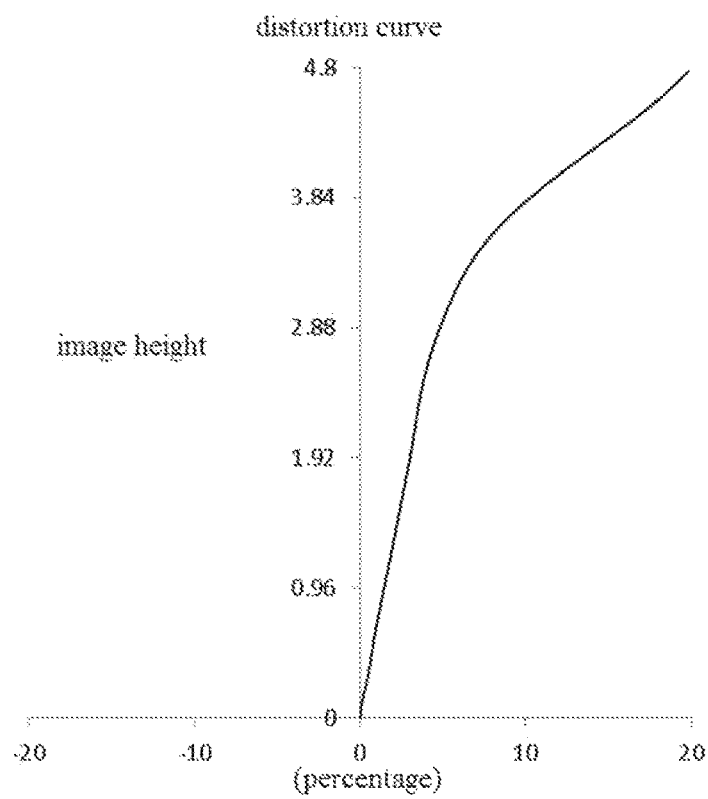

FIG. 10A shows a longitudinal aberration curve of the camera lens group according to Embodiment 5 to represent deviation of a convergence focal point after light of different wavelengths passes through the lens. FIG. 10B shows an astigmatism curve of the camera lens group according to Embodiment 5 to represent a tangential image surface curvature and a sagittal image surface curvature. FIG. 10C shows a distortion curve of the camera lens group according to Embodiment 5 to represent distortion values corresponding to different image heights. According to FIGS. 10A-10C, it can be seen that the camera lens group provided in Embodiment 5 may achieve high imaging quality.

Embodiment 6

Figure 11:
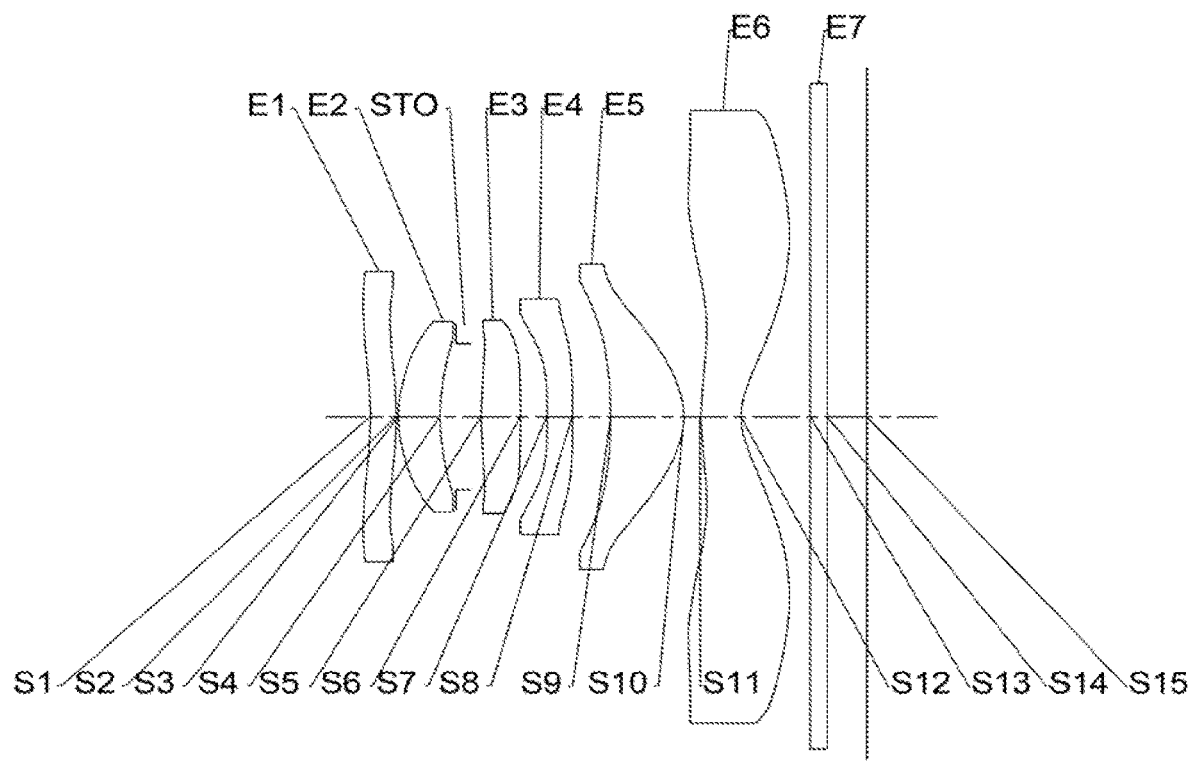
FIG. 11 shows a structure diagram of a camera lens group according to Embodiment 6 of the disclosure.

A camera lens group according to Embodiment 6 of the disclosure will be described below with reference to FIGS. 11-12C. FIG. 11 is a structure diagram of a camera lens group according to Embodiment 6 of the disclosure.

As shown in FIG. 11, the camera lens group sequentially includes, from an object side to an image side, a first lens E1, a second lens E2, a diaphragm STO, a third lens E3, a fourth lens E4, a fifth lens E5, a sixth lens E6, an optical filter E7, and an imaging surface S15.

The first lens E1 has a positive refractive power, an object-side surface S1 thereof is a concave surface, while an image-side surface S2 is a convex surface. The second lens E2 has a positive refractive power, an object-side surface S3 thereof is a convex surface, while an image-side surface S4 is a concave surface. The third lens E3 has a positive refractive power, an object-side surface S5 thereof is a convex surface, while an image-side surface S6 is a concave surface. The fourth lens E4 has a negative refractive power, an object-side surface S7 thereof is a concave surface, while an image-side surface S8 is a concave surface. The fifth lens E5 has a positive refractive power, an object-side surface S9 thereof is a concave surface, while an image-side surface S10 is a convex surface. The sixth lens E6 has a negative refractive power, an object-side surface S11 thereof is a convex surface, while an image-side surface S12 is a concave surface. An optical filter E7 has an object-side surface S13 and an image-side surface S14. Light from an object sequentially penetrates through each of the surfaces S1 to S14 and is finally imaged on the imaging surface S15.

In the example, a total effective focal length f of the camera lens group is 3.92 mm, a TTL (i.e., a distance from the object-side surface S1 of the first lens E1 to the imaging surface S15 of the camera lens group on an optical axis) of the camera lens group is 6.16 mm, ImgH is a half of a diagonal length of an effective pixel region on the imaging surface S15 of the camera lens group, ImgH is 4.64 mm, a maximum Semi-FOV of the camera lens group is 47.0°, and an F-number (Fno) of the camera lens group is 1.89.

Table 11 shows a table of basic parameters for the camera lens group of Embodiment 6, and units of the curvature radius, the thickness/distance and the focal length are all millimeter (mm). Table 12 shows high-order coefficients applied to each aspheric mirror surface in Embodiment 6. A surface type of each aspheric surface may be defined by formula (1) given in Embodiment 1.

TABLE 11

| | | | | Material | | | |
|---|---|---|---|---|---|---|---|
| Surface number | Surface type | Curvature radius | Thickness/ distance | Refractive index | Abbe number | Focal length | Conic coefficient |
| OBJ | Spherical | Infinite | Infinite | | | | |
| S1 | Aspheric | −4.2222 | 0.3175 | 1.68 | 19.2 | 170.52 | −39.9028 |
| S2 | Aspheric | −4.1971 | 0.0249 | | | | −51.0694 |
| S3 | Aspheric | 2.0102 | 0.5158 | 1.55 | 56.1 | 10.09 | −0.7109 |
| S4 | Aspheric | 2.8791 | 0.2033 | | | | −18.3425 |
| STO | Spherical | Infinite | 0.3055 | | | | |
| S5 | Aspheric | 5.7414 | 0.4927 | 1.55 | 56.1 | 10.63 | −11.5786 |
| S6 | Aspheric | 500.0000 | 0.3335 | | | | 99.0000 |
| S7 | Aspheric | −16.5029 | 0.3101 | 1.68 | 19.2 | −12.90 | 31.9434 |
| S8 | Aspheric | 18.7168 | 0.4769 | | | | 87.9338 |
| S9 | Aspheric | −6.8344 | 0.9083 | 1.55 | 56.1 | 2.42 | 8.8536 |
| S10 | Aspheric | −1.1590 | 0.2064 | | | | −1.0081 |

TABLE 11-continued

| Surface number | Surface type | Curvature radius | Thickness/ distance | Material Refractive index | Abbe number | Focal length | Conic coefficient |
|---|---|---|---|---|---|---|---|
| S11 | Aspheric | 2.5194 | 0.5000 | 1.54 | 55.9 | −2.86 | −41.1209 |
| S12 | Aspheric | 0.8884 | 0.8626 | | | | −4.4873 |
| S13 | Spherical | Infinite | 0.2100 | 1.52 | 64.2 | | |
| S14 | Spherical | Infinite | 0.4951 | | | | |
| S15 | Spherical | Infinite | | | | | |

TABLE 12

| Surface number | A4 | A6 | A8 | A10 | A12 |
|---|---|---|---|---|---|
| S1 | 4.2449E−03 | 1.3880E−02 | −1.4205E−02 | 1.0619E−02 | −5.8782E−03 |
| S2 | −9.7926E−03 | 4.9508E−02 | −5.9664E−02 | 5.2611E−02 | −3.3296E−02 |
| S3 | −1.3111E−02 | −1.0603E−03 | 6.3905E−02 | −1.7150E−01 | 2.8334E−01 |
| S4 | 3.3026E−02 | −1.9082E−02 | −2.7183E−02 | 1.4392E−01 | −2.5397E−01 |
| S5 | −2.0653E−02 | −3.9407E−03 | −2.5617E−02 | 5.9599E−02 | −1.3324E−01 |
| S6 | −7.3870E−02 | 1.0772E−01 | −4.3043E−01 | 9.2877E−01 | −1.2920E+00 |
| S7 | −1.6640E−01 | 1.3455E−01 | −2.8811E−01 | 4.5386E−01 | −5.1435E−01 |
| S8 | −1.2986E−01 | 9.8581E−02 | −1.1418E−01 | 1.0305E−01 | −6.3282E−02 |
| S9 | −1.4773E−02 | 5.3316E−04 | 1.2555E−02 | −1.7991E−02 | 1.0517E−02 |
| S10 | 9.1155E−02 | −3.2386E−02 | −1.8621E−02 | 3.8354E−02 | −2.7415E−02 |
| S11 | −3.4789E−02 | 4.8124E−03 | 8.2828E−05 | −1.2727E−04 | 2.7406E−05 |
| S12 | −3.8472E−02 | 1.1586E−02 | −2.7730E−03 | 4.7289E−04 | −5.5669E−05 |

| Surface number | A14 | A16 | A18 | A20 |
|---|---|---|---|---|
| S1 | 2.2141E−03 | −5.2468E−04 | 6.9714E−05 | −3.9274E−06 |
| S2 | 1.4301E−02 | −3.8917E−03 | 5.9869E−04 | −3.9307E−05 |
| S3 | −2.9369E−01 | 1.8527E−01 | −6.4363E−02 | 9.4400E−03 |
| S4 | 2.2954E−01 | −8.5047E−02 | −8.0640E−03 | 1.0149E−02 |
| S5 | 1.8939E−01 | −1.5833E−01 | 6.9190E−02 | −1.1934E−02 |
| S6 | 1.1419E+00 | −6.1434E−01 | 1.8267E−01 | −2.2944E−02 |
| S7 | 4.3049E−01 | −2.3116E−01 | 6.8278E−02 | −8.3813E−03 |
| S8 | 3.1468E−02 | −1.2053E−02 | 2.7965E−03 | −2.7503E−04 |
| S9 | −2.7773E−03 | 2.1654E−04 | 3.5628E−05 | −5.4438E−06 |
| S10 | 1.0914E−02 | −2.4703E−03 | 2.9482E−04 | −1.4392E−05 |
| S11 | −3.4476E−06 | 2.5534E−07 | −1.0141E−08 | 1.6578E−10 |
| S12 | 4.3910E−06 | −2.1942E−07 | 6.2371E−09 | −7.6665E−11 |

Figure 12A:
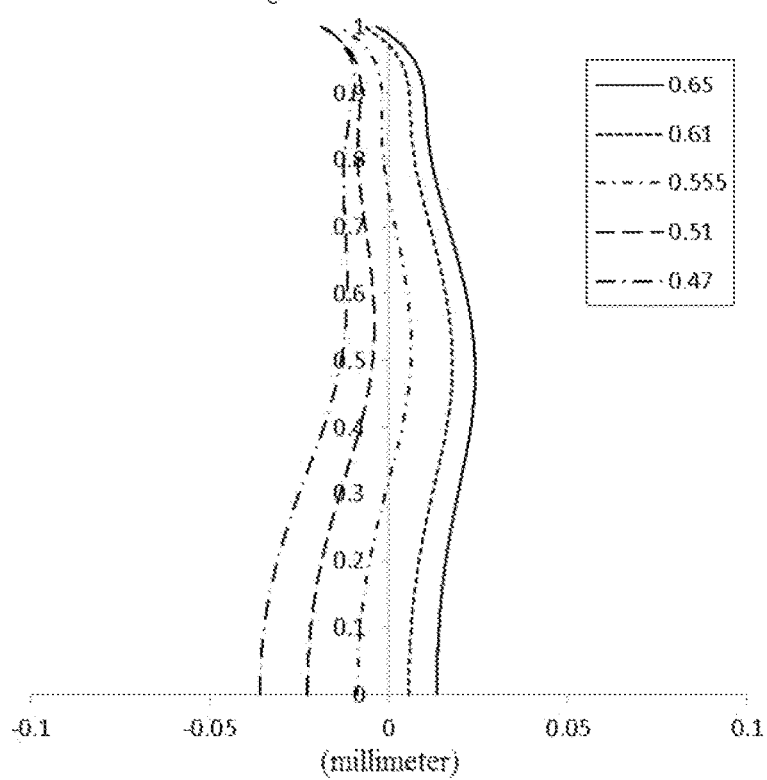
FIGS. 12A-12C show a longitudinal aberration curve, an astigmatism curve, and a distortion curve of a camera lens group according to Embodiment 6 respectively.
Figure 12B:
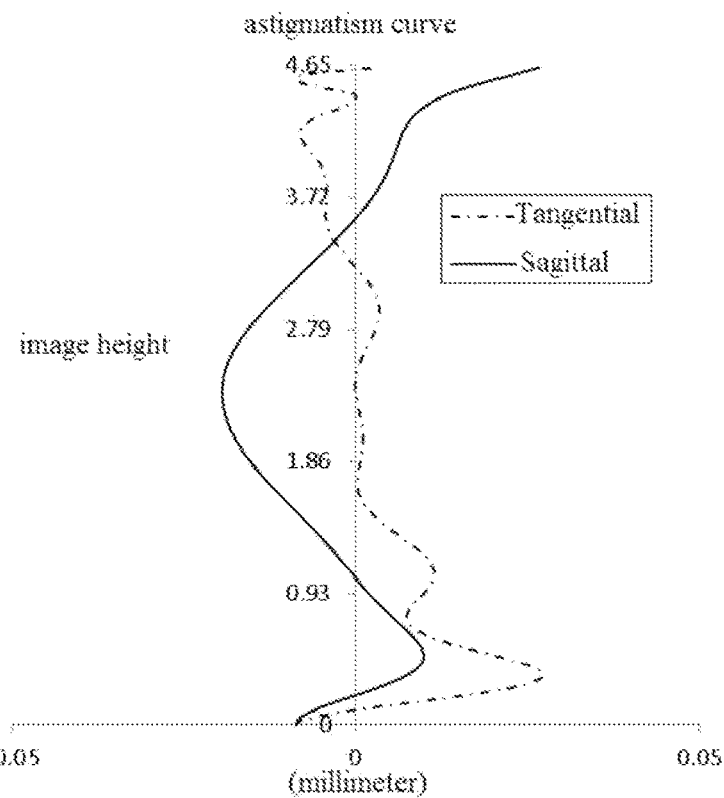
Figure 12C:
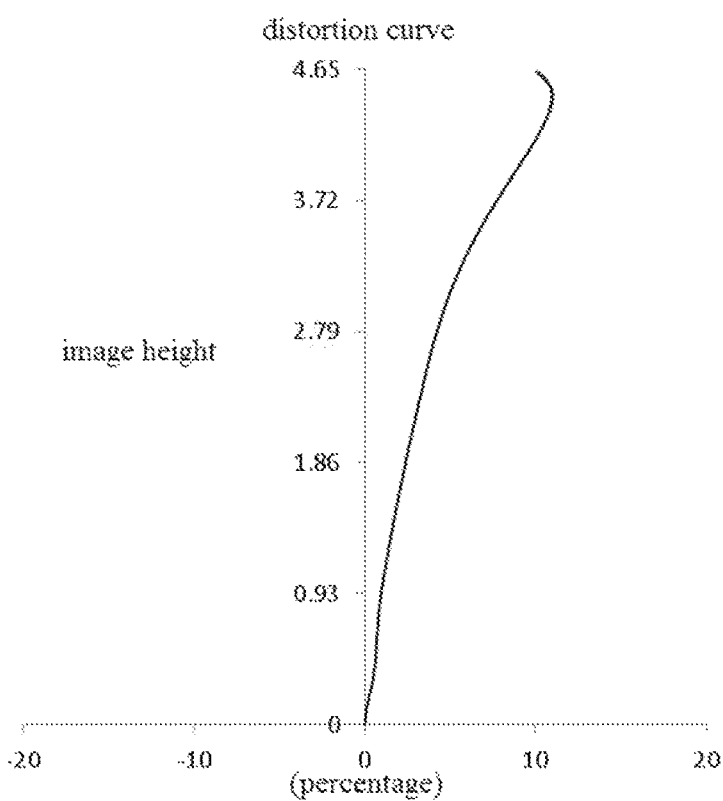

FIG. 12A shows a longitudinal aberration curve of the camera lens group according to Embodiment 6 to represent deviation of a convergence focal point after light of different wavelengths passes through the lens. FIG. 12B shows an astigmatism curve of the camera lens group according to Embodiment 6 to represent a tangential image surface curvature and a sagittal image surface curvature. FIG. 12C shows a distortion curve of the camera lens group according to Embodiment 6 to represent distortion values corresponding to different image heights. According to FIGS. 12A-12C, it can be seen that the camera lens group provided in Embodiment 6 may achieve high imaging quality.

From the above, Embodiment 1 to Embodiment 6 satisfy a relationship shown in Table 13 respectively.

TABLE 13

| Conditional expression | embodiment 1 | 2 | 3 | 4 | 5 | 6 |
|---|---|---|---|---|---|---|
| TTL/ImgH × f(mm) | 5.28 | 4.98 | 4.53 | 4.90 | 4.77 | 5.21 |
| TTL/ImgH | 1.32 | 1.34 | 1.37 | 1.33 | 1.31 | 1.33 |
| ImgH(mm) | 4.77 | 4.77 | 4.64 | 4.77 | 4.77 | 4.64 |
| f3/f | 1.66 | 2.17 | 3.53 | 2.28 | 2.35 | 2.71 |
| ImgH/DT61 | 1.27 | 1.18 | 1.35 | 1.29 | 1.42 | 1.31 |
| (R11 + R12)/(R11 − R12) | 1.57 | 2.17 | 2.40 | 2.48 | 2.35 | 2.09 |
| R4/R3 | 1.41 | 1.66 | 0.85 | 1.72 | 1.70 | 1.43 |
| f/R3 | 2.07 | 1.82 | 0.98 | 1.84 | 1.80 | 1.95 |
| (SAG41 + SAG42)/(SAG41 − SAG42) | 3.76 | 3.36 | 4.78 | 3.55 | 3.54 | 3.19 |
| DT62/DT22 | 4.04 | 4.17 | 3.44 | 3.74 | 3.50 | 3.92 |
| ΣAT/TD | 0.30 | 0.24 | 0.26 | 0.27 | 0.27 | 0.34 |

TABLE 13-continued

| Conditional expression | embodiment | | | | | |
|---|---|---|---|---|---|---|
| | 1 | 2 | 3 | 4 | 5 | 6 |
| (CT3 + CT4)/(CT3 − CT4) | 3.63 | 4.04 | 2.21 | 5.35 | 5.19 | 4.40 |
| FOV(°) | 102.0 | 112.8 | 108.7 | 103.5 | 102.3 | 94.0 |

The disclosure also provides an imaging device, of which an electronic photosensitive element may be a Charge-Coupled Device (CCD) or a Complementary Metal Oxide Semiconductor (CMOS). The imaging device may be an independent imaging device such as a digital camera, or may be an imaging module integrated into a mobile electronic device such as a mobile phone. The imaging device is provided with the abovementioned camera lens group.

The above description is only description about the preferred embodiments of the disclosure and adopted technical principles. It is understood by those skilled in the art that the scope of invention involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. A camera lens group with a total of six lenses, sequentially comprising, from an object side to an image side along an optical axis:
a first lens with a refractive power, an object-side surface thereof being a concave surface, while an image-side surface being a convex surface;
a second lens with a refractive power, an object-side surface thereof being a convex surface, while an image-side surface being a concave surface;
a third lens with a positive refractive power;
a fourth lens with a refractive power;
a fifth lens with a positive refractive power, an object-side surface thereof being a concave surface, while an image-side surface being a convex surface; and
a sixth lens with a negative refractive power, an object-side surface thereof being a convex surface, while an image-side surface being a concave surface,
wherein ImgH is a half of a diagonal length of an effective pixel region on an imaging surface of the camera lens group, and the ImgH satisfies: ImgH>4.60 mm.

2. The camera lens group according to claim 1, wherein the camera lens group further comprises a diaphragm arranged between the second lens and the third lens.

3. The camera lens group according to claim 1, wherein TTL is a distance from the object-side surface of the first lens to the imaging surface of the camera lens group on the optical axis, a total effective focal length f of the camera lens group and the TTL and the ImgH satisfy: 4.00 mm<TTL/ImgH×f<5.50 mm.

4. The camera lens group according to claim 1, wherein TTL is a distance from the object-side surface of the first lens to the imaging surface of the camera lens group on the optical axis, the TTL and the ImgH satisfy: TTL/ImgH≤1.37.

5. The camera lens group according to claim 1, wherein an effective focal length f3 of the third lens and a total effective focal length f of the camera lens group satisfy: 1.00<f3/f<4.00.

6. The camera lens group according to claim 1, wherein DT61 is a maximum effective radius of the object-side surface of the sixth lens, the ImgH and the DT61 satisfy: 1.00<ImgH/DT61<1.50.

7. The camera lens group according to claim 1, wherein a curvature radius R11 of the object-side surface of the sixth lens and a curvature radius R12 of the image-side surface of the sixth lens satisfy: 1.00<(R11+R12)/(R11−R12)<3.00.

8. The camera lens group according to claim 1, wherein a curvature radius R3 of the object-side surface of the second lens and a curvature radius R4 of the image-side surface of the second lens satisfy: 0.50<R4/R3<2.00.

9. The camera lens group according to claim 8, wherein a curvature radius R3 of the object-side surface of the second lens and a total effective focal length f of the camera lens group satisfy: 0.50<f/R3<2.50.

10. The camera lens group according to claim 1, wherein SAL51 is a distance from an intersection point of an object-side surface of the fourth lens and the optical axis to an effective radius vertex of the object-side surface of the fourth lens on the optical axis, and SAL52 is a distance from an intersection point of an image-side surface of the fourth lens and the optical axis to an effective radius vertex of the image-side surface of the fourth lens on the optical axis, the SAL51 and the SAL52 satisfy: 3.00<(SAL51+SAL52)/(SAL51−SAL52)<5.00.

11. The camera lens group according to claim 1, wherein a maximum effective radius DT62 of the image-side surface of the sixth lens and a maximum effective radius DT22 of the image-side surface of the second lens satisfy: 3.00<DT62/DT22<4.50.

12. The camera lens group according to claim 1, wherein a center thickness CT3 of the third lens on the optical axis and a center thickness CT4 of the fourth lens on the optical axis satisfy: 2.00<(CT3+CT4)/(CT3−CT4)<6.00.

13. The camera lens group according to claim 1, wherein TD is a distance from the object-side surface of the first lens to the image-side surface of the sixth lens on the optical axis, and ΣAT is a sum of spacing distances of any two adjacent lenses in the first lens to the sixth lens on the optical axis satisfy: ΣAT/TD<0.35.

14. The camera lens group according to claim 1, wherein a maximum field of view FOV of the camera lens group satisfies: FOV≥94.0°.

15. A camera lens group with a total of six lenses, sequentially comprising, from an object side to an image side along an optical axis:
a first lens with a refractive power, wherein an object-side surface thereof is a concave surface, while an image-side surface is a convex surface;
a second lens with a refractive power, wherein an object-side surface thereof is a convex surface, while an image-side surface is a concave surface;

a third lens with a positive refractive power;

a fourth lens with a refractive power;

a fifth lens with a positive refractive power, wherein an object-side surface thereof is a concave surface, while an image-side surface is a convex surface; and a sixth lens with a negative refractive power, wherein an object-side surface thereof is a convex surface, while an image-side surface is a concave surface, wherein TTL is a distance from the object-side surface of the first lens to an imaging surface of the camera lens group on the optical axis, and ImgH is a half of a diagonal length of an effective pixel region on the imaging surface, the TTL and the ImgH satisfy: $TTL/ImgH \leq 1.37$.

16. The camera lens group according to claim 15, wherein the camera lens group further comprises a diaphragm arranged between the second lens and the third lens.

17. The camera lens group according to claim 15, wherein the TTL and the ImgH and a total effective focal length f of the camera lens group satisfy: $4.00 \text{ mm} < TTL/ImgH \times f < 5.50 \text{ mm}$.

18. The camera lens group according to claim 17, wherein the ImgH satisfies: $ImgH > 4.60 \text{ mm}$.

19. The camera lens group according to claim 15, wherein an effective focal length f3 of the third lens and a total effective focal length f of the camera lens group satisfy: $1.00 < f3/f < 4.00$.

20. The camera lens group according to claim 15, wherein DT61 is a maximum effective radius of the object-side surface of the sixth lens, the ImgH and the DT61 satisfy: $1.00 < ImgH/DT61 < 1.50$.

\* \* \* \* \*